(12) United States Patent
Kono et al.

(10) Patent No.: US 10,719,911 B2
(45) Date of Patent: Jul. 21, 2020

(54) INFORMATION PROCESSING METHOD AND SYSTEM FOR EXECUTING THE INFORMATION PROCESSING METHOD

(71) Applicant: COLOPL, Inc., Tokyo (JP)

(72) Inventors: Yuki Kono, Tokyo (JP); Ippei Kondo, Tokyo (JP); Takeshi Kada, Chiba (JP)

(73) Assignee: COLOPL, INC., Tokyo (JP)

(*) Notice: Subject to any disclaimer, the term of this patent is extended or adjusted under 35 U.S.C. 154(b) by 0 days.

(21) Appl. No.: 16/283,821

(22) Filed: Feb. 25, 2019

(65) Prior Publication Data

US 2019/0188826 A1 Jun. 20, 2019

Related U.S. Application Data

(63) Continuation of application No. 15/672,258, filed on Aug. 8, 2017, now Pat. No. 10,255,658.

(30) Foreign Application Priority Data

Aug. 9, 2016 (JP) .................. 2016-157052
Aug. 24, 2016 (JP) .................. 2016-163926
(Continued)

(51) Int. Cl.
*G06T 3/20* (2006.01)
*G06F 3/01* (2006.01)
(Continued)

(52) U.S. Cl.
CPC ............... *G06T 3/20* (2013.01); *G06F 3/011* (2013.01); *G06F 3/012* (2013.01); *G06F 3/014* (2013.01);
(Continued)

(58) Field of Classification Search
CPC ....... G06T 3/20; G06T 15/20; G06T 2210/21; G06F 3/011; G06F 3/012; G06F 3/014;
(Continued)

(56) References Cited

U.S. PATENT DOCUMENTS 6,040,840 A 3/2000 Koshiba et al.
8,963,834 B2 2/2015 Park et al.
(Continued)

FOREIGN PATENT DOCUMENTS

JP 7-239750 A 9/1995
JP 10-334278 A 12/1998
(Continued)

OTHER PUBLICATIONS

Office Action in CN Application No. 201780041636.2, dated Sep. 18, 2019. 11pp.
(Continued)

*Primary Examiner* — Lixi C Simpson
(74) *Attorney, Agent, or Firm* — Hauptman Ham, LLP

(57) ABSTRACT

A method includes defining a virtual space including a virtual camera; an operation object; and a target object. The method includes detecting a position of a head-mounted device and a position of a part of a body other than a head. The method includes moving the virtual camera in accordance with movement of the head-mounted device. The method includes moving the operation object in accordance with movement of the part of the body. The method includes selecting the target object in accordance with movement of the operation object. Selecting the target object includes correcting a direction or a position of the target object based on a positional relationship between the operation object and the target object; and associating the target object, the corrected direction or the corrected position, with the opera- (Continued)

tion object. The method includes moving the target object in accordance with movement of the operation object.

20 Claims, 37 Drawing Sheets

(30) Foreign Application Priority Data

Aug. 26, 2016 (JP) .................................. 2016-165952
Sep. 12, 2016 (JP) .................................. 2016-178091

(51) Int. Cl.
*G06T 15/20* (2011.01)
*G06F 3/0481* (2013.01)
G06F 3/0484 (2013.01)

(52) U.S. Cl.
CPC .......... *G06F 3/017* (2013.01); *G06F 3/04815* (2013.01); *G06T 15/20* (2013.01); *G06F 3/013* (2013.01); *G06F 3/04842* (2013.01); *G06T 2210/21* (2013.01)

(58) Field of Classification Search
CPC ...... G06F 3/017; G06F 3/04815; G06F 3/013; G06F 3/04842
See application file for complete search history.

(56) References Cited

U.S. PATENT DOCUMENTS

| | | | |
|---|---|---|---|
| 9,606,584 | B1 | 3/2017 | Fram |
| 9,696,795 | B2 | 7/2017 | Marcolina et al. |
| 2010/0302138 | A1* | 12/2010 | Poot .................. G06F 3/011 345/156 |
| 2011/0304540 | A1 | 12/2011 | Nishimoto et al. |
| 2012/0229511 | A1 | 9/2012 | Irimoto |
| 2013/0005420 | A1 | 1/2013 | Ueno et al. |
| 2014/0306891 | A1 | 10/2014 | Latta et al. |
| 2015/0243082 | A1 | 8/2015 | Ueno et al. |
| 2015/0352437 | A1 | 12/2015 | Koseki et al. |
| 2016/0209916 | A1 | 7/2016 | Sendai et al. |
| 2017/0060230 | A1 | 3/2017 | Faaborg et al. |
| 2017/0139483 | A1 | 5/2017 | Selker et al. |
| 2017/0270713 | A1 | 9/2017 | Dooley et al. |
| 2017/0323489 | A1* | 11/2017 | Clement ................ G06T 13/40 |
| 2017/0324841 | A1 | 11/2017 | Clement et al. |
| 2018/0095616 | A1* | 4/2018 | Valdivia ................. G06T 13/40 |
| 2018/0174347 | A1* | 6/2018 | Chaney ................... G06T 13/40 |

FOREIGN PATENT DOCUMENTS

| | | | |
|---|---|---|---|
| JP | 2002-149581 | A | 5/2002 |
| JP | 2004-295577 | A | 10/2004 |
| JP | 2011-258161 | A | 12/2011 |
| JP | 2012-190081 | A | 10/2012 |
| JP | 2013-9748 | A | 1/2013 |
| JP | 2014-68689 | A | 4/2014 |
| JP | 2015-118556 | A | 6/2015 |
| JP | 2015-232783 | A | 12/2015 |

OTHER PUBLICATIONS

Office Action in JP Application No. 2016-165952, dated Feb. 14, 2017, 6 pp.
Office Action in JP Application No. 2016-165952, dated May 1, 2017, 6 pp.
Office Action in JP Application No. 2016-157052, dated Feb. 1, 2017, 7 pp.
Notice of Allowance in JP Application No. 2016-157052, dated Apr. 6, 2017, 5 pp.
Office Action in JP Application No. 2016-163926, dated Mar. 22, 2017, 4 pp.
Notice of Allowance in JP Application No. 2016-163926, dated May 24, 2017, 5 pp.
Oculus,Toybox Demo for Oculus Touch, [online] Oct. 13, 2015, youtube, URL, https://www.youtube.com/watch?v=iFEMiyGMa58, retrieved Mar. 13, 2017, 5 pp.
Hideto Obara et al. "Direct Manipulation of Virtual Objects with Actor's Hand in Virtual Studio", Human Interface Society, Jun. 6, 2016, vol. 8, No. 3 p. 103-109, Kyoto Japan, 9 pp.
Yoshifumi Kitamura et al. "The manipulation environment of virtual and real objects using a magnetic metaphor", Transactions of the Virtual Reality of Japan, 2001, vol. 6 No. 4, p. 305-311, 10 pp.
Kenji Funahashi et al. "A Model for Manipulation of Objects with Virtual Hand in 3-D Virtual Space", The transactions of the institute of Electronics, Information and communication engineers D-II, May 25, 1998 vol. J81-D-II No. 5 p. 822-831, 14 pp.
International Search Report in PCT/JP2017/028882, dated Oct. 31, 2017. 5pp.

* cited by examiner

FIG. 28

| MASK No. | GRAPHIC | ENDURANCE | ATTACKING POWER | PRICE |
|---|---|---|---|---|
| 1 | A | 0 | 0 | 100 YEN |
| 2 | B | +100 | 0 | 500 YEN |
| 3 | C | 0 | +100 | 500 YEN |
| ... | ... | ... | ... | ... |

FIG. 31

| USER ID | POSITION OF CAMERA (X,Y,Z) | DIRECTION OF CAMERA ($\theta u, \theta v, \theta w$) | POSITION OF HAND (X,Y,Z) | DIRECTION OF HAND ($\theta u, \theta v, \theta w$) | STATE OF HAND | MASK No. |
|---|---|---|---|---|---|---|
| 1 | X1,Y1,Z1 | u1,v1,w1 | X2,Y2,Z2 | u2,v2,w2 | Open | 1 |
| 2 | X3,Y3,Z3 | u3,v3,w3 | X4,Y4,Z4 | u4,v4,w4 | Close | 2 |
| ... | ... | ... | ... | ... | ... | ... |

INFORMATION PROCESSING METHOD AND SYSTEM FOR EXECUTING THE INFORMATION PROCESSING METHOD

RELATED APPLICATIONS

The present application is a continuation of U.S. patent application Ser. No. 15/672,258 filed Aug. 8, 2017, which claims priority to JP2016-157052 filed Aug. 9, 2016, JP2016-163926 filed Aug. 24, 2016, JP2016-165952 filed Aug. 26, 2016 and JP2016-178091 filed Sep. 12, 2016. The disclosures of which are hereby incorporated by reference herein in their entirety.

TECHNICAL FIELD

This disclosure relates to an information processing method and a system for executing the information processing method.

BACKGROUND ART

In Non-Patent Document 1, there is described a technology of changing a state of a hand object in a virtual reality (VR) space based on a state (for example, position and inclination) of a hand of a user in a real space, and operating the hand object to exert a predetermined action on a predetermined object in the virtual space.

[Non-Patent Document 1] "Toybox Demo for Oculus Touch", [online], Oct. 13, 2015, Oculus, [retrieved on Aug. 6, 2016], Internet <https://www.youtube.com/watch?v=iFEMiyGMa58>

SUMMARY

In Non-Patent Document 1, there is room, for improvement when a predetermined object is operated through use of a hand object. For example, there is room for improvement when a user is provided with such a virtual experience that cannot be acquired by the user operating an actual object in a real space, and the user attempts to operate a desired virtual object at a desired timing. With this configuration, the virtual experience of the user interacting with the virtual object in various environments, for example, a VR space, an augmented reality (AR) space, and a mixed reality (MR) space is improved.

At least one embodiment of this disclosure has an object to provide an information processing method and a system, for executing the information processing method, which are capable of improving a virtual experience.

According to at least one embodiment of this disclosure, there is provided an information processing method for controlling a head-mounted device including a display unit on a computer. The information processing method is performed by a processor of the computer. The method, includes identifying virtual space data for defining a virtual space that includes a virtual camera, an operation object, and a plurality of target objects including a first object and a second object. The method further includes moving the virtual camera in accordance with a movement of the head-mounted device. The method further includes moving the operation object in accordance with a movement of a part of a body other than a head of a user. The method further includes selecting the first object or the second object in accordance with a movement of the operation object. The method further includes defining a visual field of the virtual camera based on a movement of the virtual camera, and displaying a visual-field image on the display unit based on the visual field and the virtual space data. The method further includes changing a display form of the first object and/or the second object when the first object satisfies a selection condition for being selected by the operation object.

According to at least one embodiment of this disclosure, providing the information processing method and the system for executing the information processing method, which are capable of improving a virtual experience, is possible.

BRIEF DESCRIPTION OF THE DRAWINGS

FIG. 28 A diagram of an example of a data structure of asset data according to at least one embodiment of this disclosure.

FIG. 31 A diagram of an example of a data structure of player information according to at least one embodiment of this disclosure.

DETAILED DESCRIPTION

Embodiments of this disclosure are described below with reference to the drawings. Once a component is described in this description of the embodiments, a description on a component having the same reference number as that of the already described component is omitted for the sake of convenience.

Figure 1:
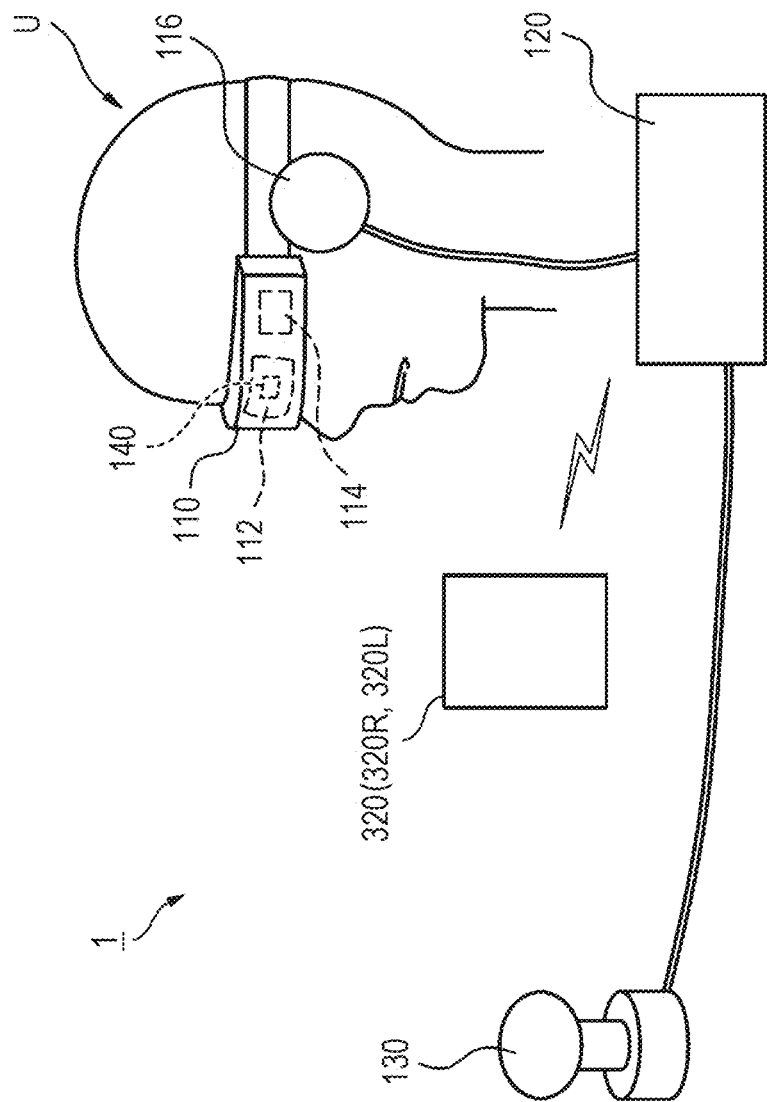
FIG. 1 A schematic diagram of a head-mounted device (HMD) system according to at least one embodiment of this disclosure.

First, with reference to FIG. 1, a configuration of a head-mounted device (HMD) system 1 is described. FIG. 1 is a schematic diagram, of the HMD system 1 according to at least one embodiment of this disclosure. In FIG. 1, the HMD system 1 includes an HMD 110 worn on a head of a user U, a position sensor 130, a control device 120, and an external controller 320.

The HMD 110 is a head-mounted display device including a display unit 112, an HMD sensor 114, and an eye gaze sensor 140. The display unit 112 includes a non-transmissive display device configured to cover a field of view (visual field) of the user U wearing the HMD 110. With this, the user U can see a visual-field image displayed on the display unit 112, and thus the user U can be immersed in a virtual space. The display unit 112 may include a left-eye display unit configured to provide an image to a left eye of the user U, and a right-eye display unit configured to provide an image to a right eye of the user U. Further, the HMD 110 may include a transmissive display device. In this case, the transmissive display device may be able to be temporarily configured as the non-transmissive display device by adjusting the transmittance thereof. Further, the visual-field image may include a configuration for presenting a real space in a part of the image forming the virtual space. For example, an image taken by a camera mounted to the HMD 110 may be displayed so as to be superimposed on a part of the visual-field image, or a transmittance of a part of the transmissive display device may be set high to enable the user to visually recognize the real space through a part of the visual-field image.

The HMD sensor 114 is mounted near the display unit 112 of the HMD 110. The HMD sensor 114 includes at least one of a geomagnetic sensor, an acceleration sensor, and an inclination sensor (for example, an angular velocity sensor or a gyro sensor), and can detect various movements of the HMD 110 worn on the head of the user U.

The eye gaze sensor 140 has an eye tracking function of detecting a line-of-sight direction of the user U. For example, the eye gaze sensor 140 may include a right-eye gaze sensor and a left-eye gaze sensor. The right-eye gaze sensor may be configured to detect reflective light reflected from the right eye (in particular, the cornea or the iris) of the user U by irradiating the right eye with, for example, infrared light, to thereby acquire information relating to a rotational angle of a right eyeball. Meanwhile, the left-eye gaze sensor may be configured to detect reflective light reflected from the left eye (in particular, the cornea or the iris) of the user U by irradiating the left eye with, for example, infrared light, to thereby acquire information relating to a rotational angle of a left eyeball.

The position sensor 130 is constructed of, for example, a position tracking camera, and is configured to detect the positions of the HMD 110 and the external controller 320. The position sensor 130 is connected to the control device 120 so as to enable communication to/from the control device 120 in a wireless or wired manner. The position sensor 130 is configured to detect information relating to positions, inclinations, or light emitting intensities of a plurality of detection points (not shown) provided in the HMD 110. Further, the position sensor 130 is configured to detect information relating to positions, inclinations, and/or light emitting intensities of a plurality of detection points 304 (refer to FIG. 4) provided in the external controller 320. The detection points are, for example, light emitting portions configured to emit infrared light or visible light. Further, the position sensor 130 may include an infrared sensor or a plurality of optical cameras.

The HMD sensor 114, the eye gaze sensor 140, and the position sensor 130 may be collectively referred to as "detection unit". The detection unit is configured to detect a movement of a part of a body of a user, and to output a detection result to the control device 120. The detection unit has such a function of detecting the movement of the head of the user U as a function of the HMD sensor 114 and a function of detecting the movement of a part of the user other than his or her head as a function of the position sensor 130. The detection unit also has such a function of detecting the movement of the line of sight of the user U as a function of the eye gaze sensor 140.

The control device 120 is capable of acquiring movement information such as the position and the direction of the HMD 110 based on the information acquired from the HMD sensor 114 or the position sensor 130, and accurately associating a position and a direction of a virtual point of view (virtual camera) in the virtual space with the position and the direction of the user U wearing the HMD 110 in the real space based on the acquired movement information. Further, the control device 120 is capable of acquiring movement information of the external controller 320 based on the information acquired from the position sensor 130, and accurately associating a position and a direction of a hand object (described later) to be displayed in the virtual space with a relative relationship of the position and the direction between the external controller 320 and the HMD 110 in the real space based on the acquired movement information. Similarly to the HMD sensor 114, the movement information of the external controller 320 may be obtained from a geomagnetic sensor, an acceleration sensor, an inclination sensor, or other sensors mounted to the external controller 320.

The control device 120 is capable of identifying each of the line of sight of the right eye and the line of sight of the left eye of the user U based on the information transmitted from the eye gaze sensor 140, to thereby identify a point of gaze being an intersection between the line of sight of the right eye and the line of sight of the left eye. Further, the control device 120 is capable of identifying a line-of-sight direction of the user U based, on the identified point of gaze. In this case, the line-of-sight direction of the user U is a line-of-sight direction of both eyes of the user U, and matches a direction of a straight line passing through the point of gaze and a midpoint of a line segment connecting between the right eye and the left eye of the user U.

Figure 2:
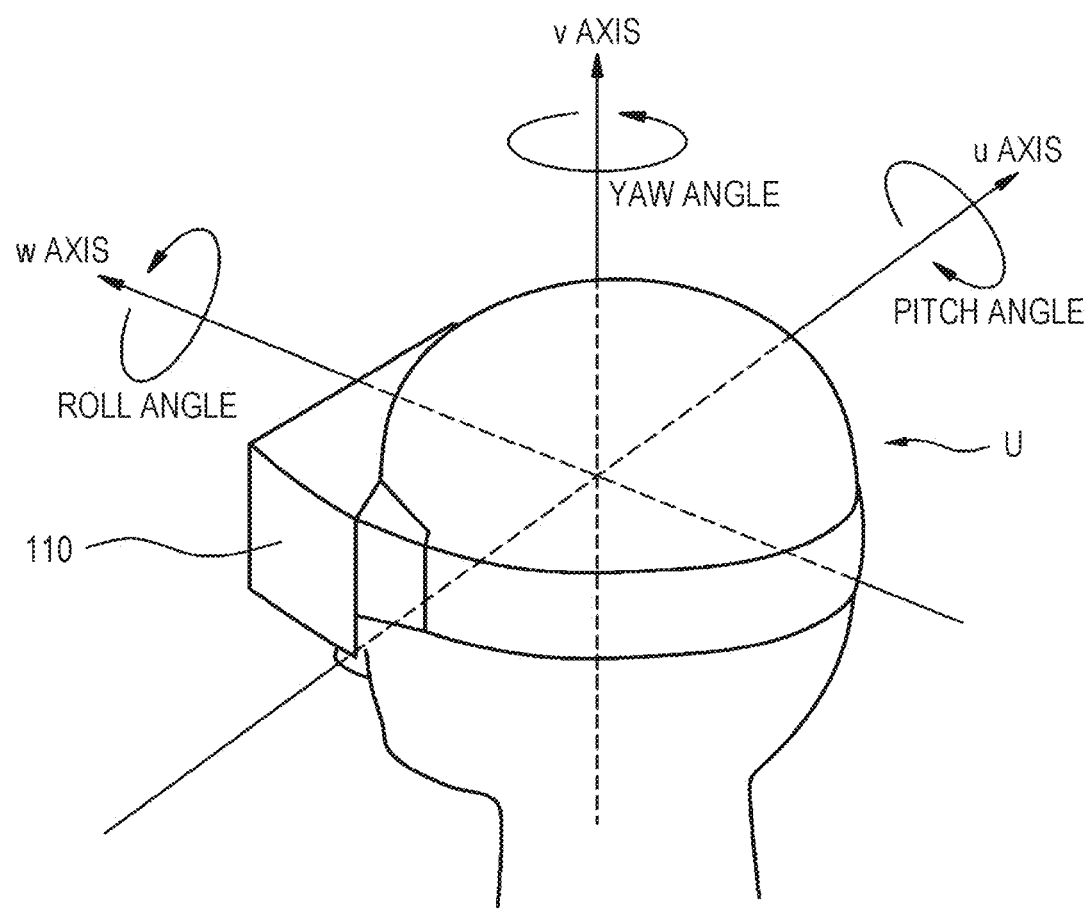
FIG. 2 A diagram of a head of a user wearing an HMD according to at least one embodiment of this disclosure.

With reference to FIG. 2, a method, of acquiring information relating to a position and a direction of the HMD 110 is described. FIG. 2 is a diagram of the head of the user U wearing the HMD 110 according to at least one embodiment of this disclosure. The information relating to the position and the direction of the HMD 110, which are synchronized with the movement of the head of the user U wearing the HMD 110, can be detected by the position sensor 130 and/or the HMD sensor 114 mounted on the HMD 110. In FIG. 2, three-dimensional coordinates (uvw coordinates) are defined about the head of the user U wearing the HMD 110. A perpendicular direct ion in which the user U stands upright is defined as a v axis, a direction being orthogonal to the v axis and passing through the center of the HMD 110 is defined as a w axis, and a direction orthogonal to the v axis and the w axis is defined as a u axis. The position sensor 130 and/or the HMD sensor 114 are/is configured to detect angles about the respective uvw axes (that is, inclinations determined by a yaw angle representing the rotation about the v axis, a pitch angle representing the rotation about the u axis, and a roll angle representing the rotation about the w axis). The control device 120 is configured to determine angular information for defining a visual axis from the virtual viewpoint based on the detected change in angles about the respective uvw axes.

Figure 3:
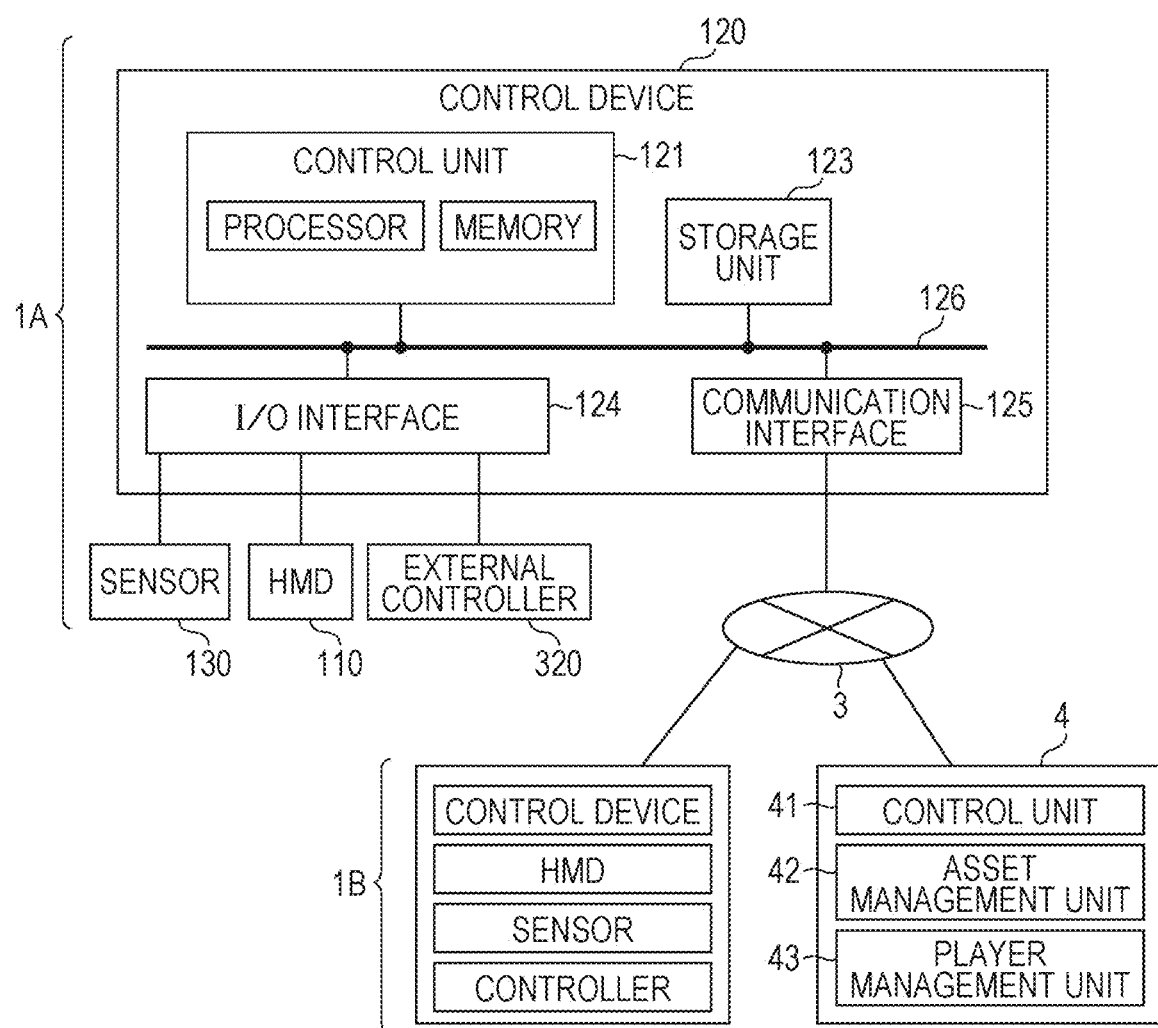
FIG. 3 A diagram of a hardware configuration of a control device according to at least one embodiment of this disclosure.

With reference to FIG. 3, a hardware configuration of the control device 120 is described. FIG. 3 is a diagram of the hardware configuration of the control device 120 according to at least one embodiment of this disclosure. The control device 120 includes a control unit 121, a storage unit 123, an input/output (I/O) interface 124, a communication interface 125, and a bus 126. The control unit 121, the storage unit 123, the I/O interface 124, and the communication interface 125 are connected to each other via the bus 126 so as to enable communication therebetween.

The control device 120 may be constructed as a personal computer, a tablet computer, or a wearable device separately from the HMD 110, or may be built into the HMD 110. Further, a part of the functions of the control device 120 may be executed by hardware in the HMD 110, and other functions of the control device 120 may be executed by hardware separate from the HMD 110.

The control unit 121 includes a memory and a processor. The memory is constructed of, for example, a read only memory (ROM) having various programs and the like stored therein or a random access memory (RAM) having a plurality of work areas in which various programs to be executed by the processor are stored. The processor is constructed of, for example, a central processing unit (CPU), a micro processing unit (MPU) and/or a graphics processing unit (GPU), and is configured to develop, on the RAM, programs designated by various programs installed into the ROM to execute various types of processing in cooperation with the RAM.

The control unit 121 may control various operations of the control device 120 by causing the processor to develop, on the RAM, a program (to be described later) for executing the information processing method on a computer according to at least one embodiment to execute the program in cooperation with the RAM. The control unit 121 executes a predetermined application program (including a game program and an interface program) stored in the memory or the storage unit 123 to display a virtual space (visual-field image) on the display unit 112 of the HMD 110. With this, the user U can be immersed in the virtual space displayed on the display unit 112.

The storage unit (storage) 123 is a storage device, for example, a hard disk drive (HDD), a solid state drive (SSD), or a USB flash memory, and is configured to store programs and various types of data. The storage unit 123 may store the program for executing the information processing method on a computer according to this embodiment. Further, the storage unit 123 may store programs for authentication of the user U and game programs including data relating to various images and objects. Further, a database including tables for managing various types of data may be constructed in the storage unit 123.

The I/O interface 124 is configured to connect each of the position sensor 130, the HMD 110, and the external controller 320 to the control device 120 so as to enable communication therebetween, and is constructed of, for example, a universal serial bus (USB) terminal, a digital visual interface (DVI) terminal, or a high-definition multimedia interface (R) (HDMI) terminal. The control device 120 may be wirelessly connected to each of the position sensor 130, the HMD 110, and the external controller 320.

The communication interface 125 is configured to connect the control device 120 to a communication network 3, for example, a local area network (LAN), a wide area network (WAN), or the Internet. The communication interface 125 includes various wire connection terminals and various processing circuits for wireless connection for communication to/from an external device on a network via the communication network 3, and is configured to adapt to communication standards for communication via the communication network 3.

The control device 120 is connected to a management server 4 via the communication network 3. The management server 4 is connected to a control device of another HMD system 1B via the communication network 3. With this, a plurality of HMD systems including the HMD systems 1A and 1B are connected to each other so as to enable communication therebetween, and can be provided with a virtual experience using a common virtual space as described later. The HMD systems 1A and 1B each have such a common configuration as illustrated in FIG. 1 and FIG. 2.

The management server 4 includes a control unit 41, an asset management unit 42, and a player management unit 43. The control unit 41 mainly includes a memory and a processor. The asset management unit 42 and the player management unit 43 mainly include a storage unit (storage). As described later, the asset management unit 42 is configured to store various objects for forming virtual space content, a background image, or other such virtual space data. When receiving a view request for predetermined content from the control device 120, the control unit 41 reads the virtual space data corresponding to the view request from the asset management, unit 42, and transmits the virtual space data to the control device 120. The control unit 41 receives an action history of the user-transmitted from, each of the HMD systems 1A and 116 and player data for identifying an object to be used, and stores the above-mentioned data in the player management unit 43. In at least one embodiment, the player management unit 43 centrally manages an ID of each user, payment data, and other such different kinds of information associated with each user.

Figure 4A:
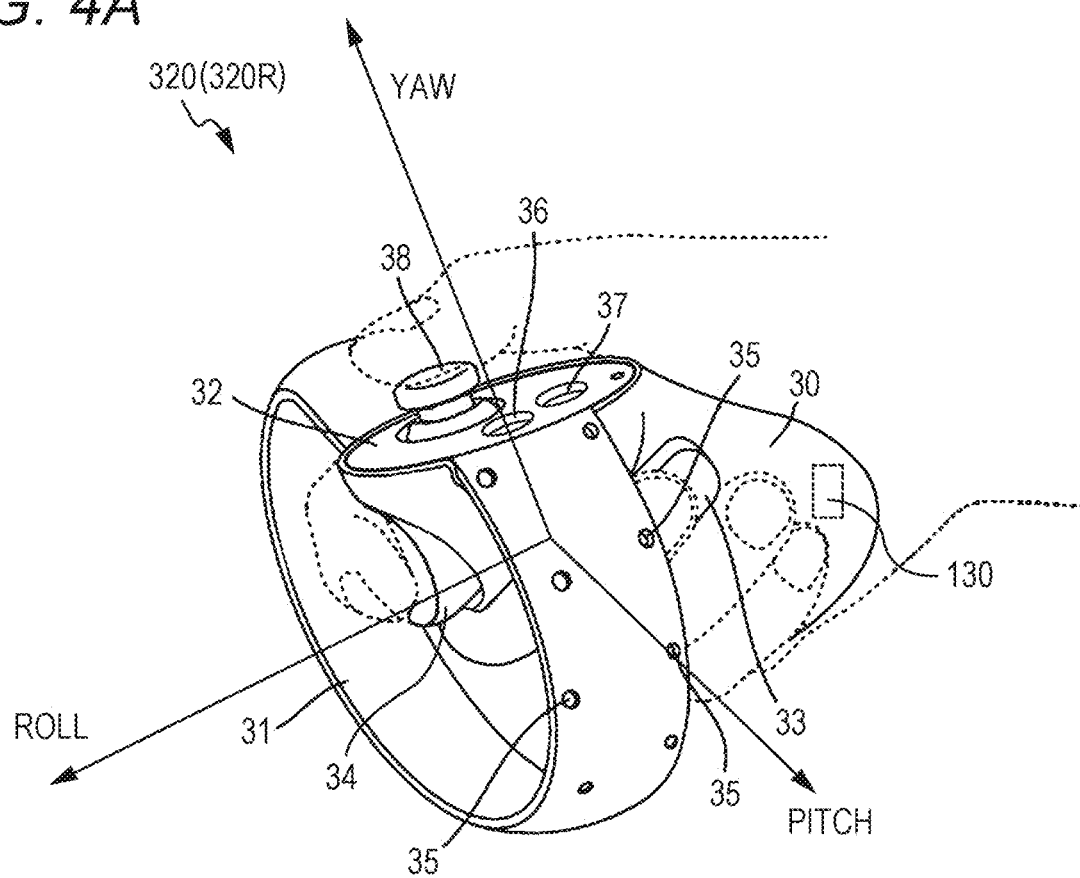
FIG. 4A A diagram of an example of a specific configuration of an external controller according to at least one embodiment of this disclosure.
Figure 4B:
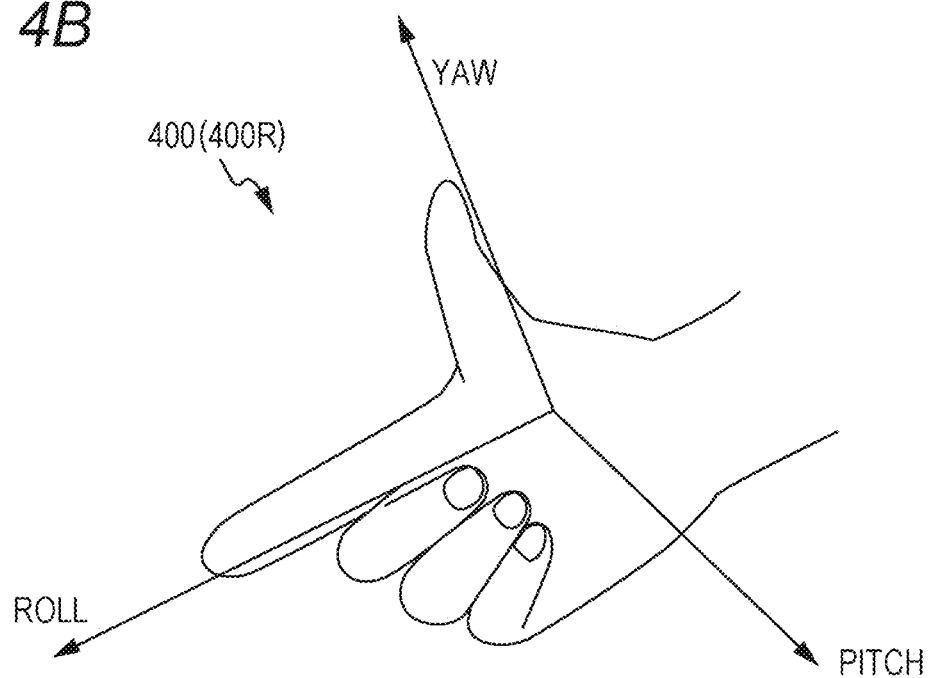
FIG. 4B A diagram of a hand of a user for holding an external controller according to at least one embodiment of this disclosure.

An example of the controller 320 is described with reference to FIGS. 4A-4B. FIG. 4A is a diagram of a schematic configuration of the controller 320 of at least one embodiment of this disclosure. FIG. 4B is a diagram of a hand of a user according to at least one embodiment of this disclosure.

In FIG. 4A, the controller 320 can include a right controller 320R and a left controller 320L in a given aspect of this disclosure. The right controller 320R is operated by the right hand of the user U. The left controller 320L is operated by the left hand of the user U. In at least one embodiment, the right controller 320R and the left controller 320L are symmetrically formed as separate devices. Therefore, the user U can freely move each of the right hand grasping the right controller 320R and the left hand grasping the left controller 320L. In at least one embodiment, the controller 320 may be an integral controller configured to receive operations of both hands. The following description is directed to the right controller 320R.

The right controller 320R includes a grip 30, a frame 31, and a top surface 32. The grip 30 is formed so as to be grasped by the right hand of the user U. For example, the grip 30 can be held by a palm of the right hand and three fingers (middle finger, ring finger, and little finger) of the user U.

The frame 31 includes a plurality of infrared LEDs 35 arranged along a circumferential direction of the frame 31. When a program using the controller 320 is being executed, the infrared LEDs 35 each emit infrared light in accordance with the progress of the program. The infrared light emitted from the infrared LEDs 35 can be used for detecting the position and the posture (inclination and direction) of each of the right controller 320R and the left controller 320L. In FIG. 4A, the infrared LEDs 35 arranged in two lines, but an arrangement of one line or three or more lines may be used.

In FIG. 4A, the posture of the controller 320 is identified based on the respective directions of yaw, roll, and pitch. Further, as illustrated in a state (B), the posture of a hand object 400 in the virtual space 200 is also identified based on the respective directions of yaw, roll, and pitch. Therefore, moving the hand object 400 in the virtual space 200 in accordance with the movement of the hand of the user in the real space by associating the posture of the controller 320 with the posture of the hand object 400 is possible.

The grip 30 includes buttons 33 and 34 and a motion sensor 130. The button 33 is arranged on a side surface of the grip 30, and is configured to receive an operation performed by the middle finger of the right hand. The button 34 is arranged on a front surf ace of the grip 30, and is configured to receive an operation performed by the index finger of the right hand. In at least one embodiment, the buttons 33 and 34 are each formed as a trigger type button. The motion sensor 130 is built into a casing of the grip 30. When the action of the user U can be detected by a camera or other such device located around the user U, the grip 30 may not include the motion sensor 130.

The top surface 32 includes buttons 36 and 37 and an analog stick 38. The buttons 36 and 37 are each formed of a push button. The buttons 36 and 37 are each configured to receive an operation performed by the thumb of the right hand of the user U. The analog stick 38 is configured to receive an operation performed from an initial position (neutral position) toward any direction of 360 degrees in a given aspect of this disclosure. The operation includes, for example, an operation for moving an object arranged in the virtual space 200.

In a given aspect of this disclosure, when the button 34 is pressed, the index finger of hand object 400R may be changed from a stretched state to a bent state. When the button 33 is pressed, the middle finger, the ring finger, and the little finger of the hand object 400R may be changed from a stretched state to a bent state. When the thumb is positioned on the top surface 32 or when any one of the buttons 36 and 37 is pressed, the thumb of the hand object 400R may be changed from a stretched state to a bent state.

Figure 5:
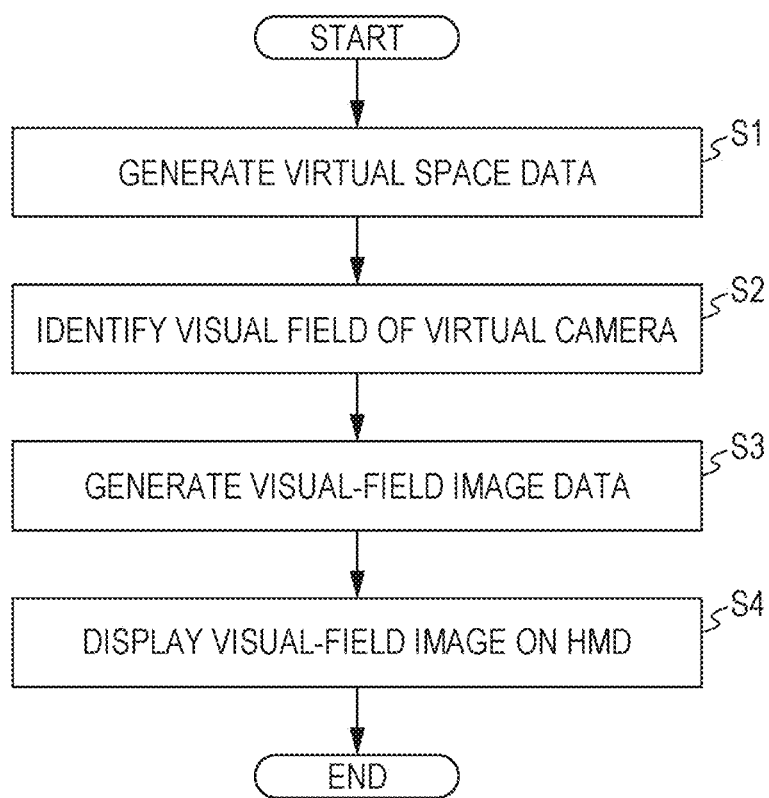
FIG. 5 A flowchart of processing of displaying a visual-field image on the HMD according to at least one embodiment of this disclosure.
Figure 6:
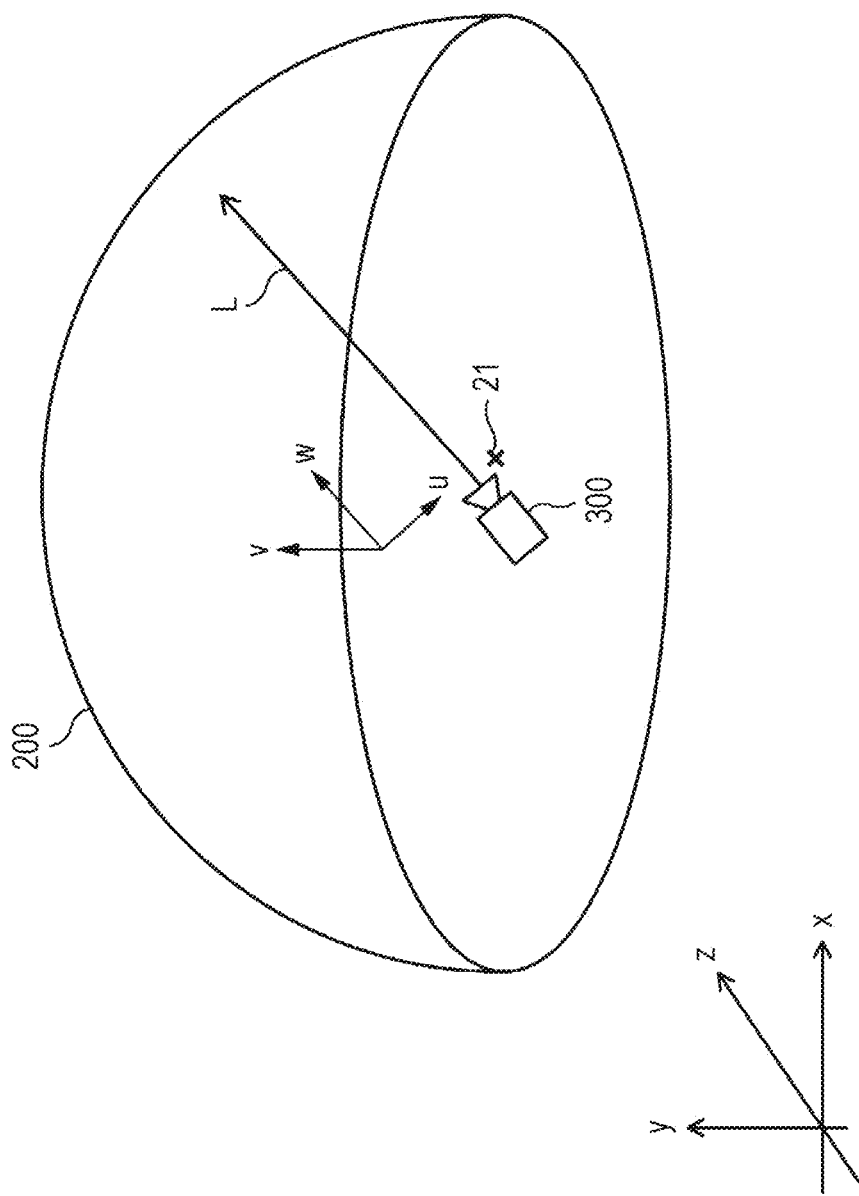
FIG. 6 An xyz spatial diagram of an example of a virtual space according to at least one embodiment of this disclosure.
Figure 7B:
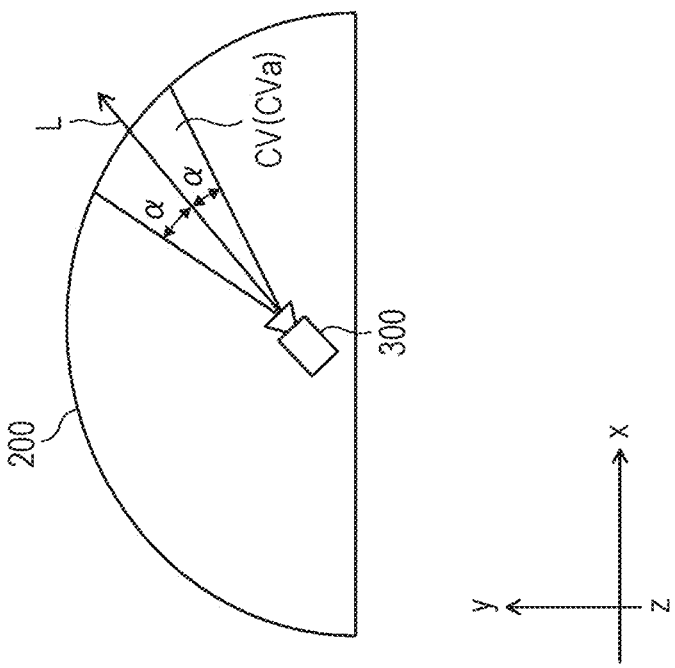
FIG. 7B A diagram, of a zx plane of the virtual space illustrated in FIG. 6 according to at least one embodiment of this disclosure.
Figure 7A:
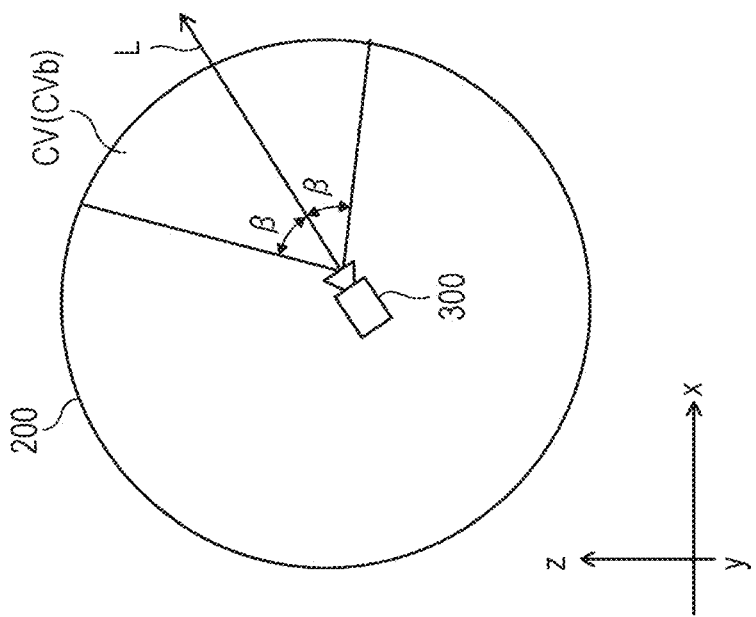
FIG. 7A A diagram of a yx plane of the virtual space illustrated in FIG. 6 according to at least one embodiment of this disclosure.
Figure 8:
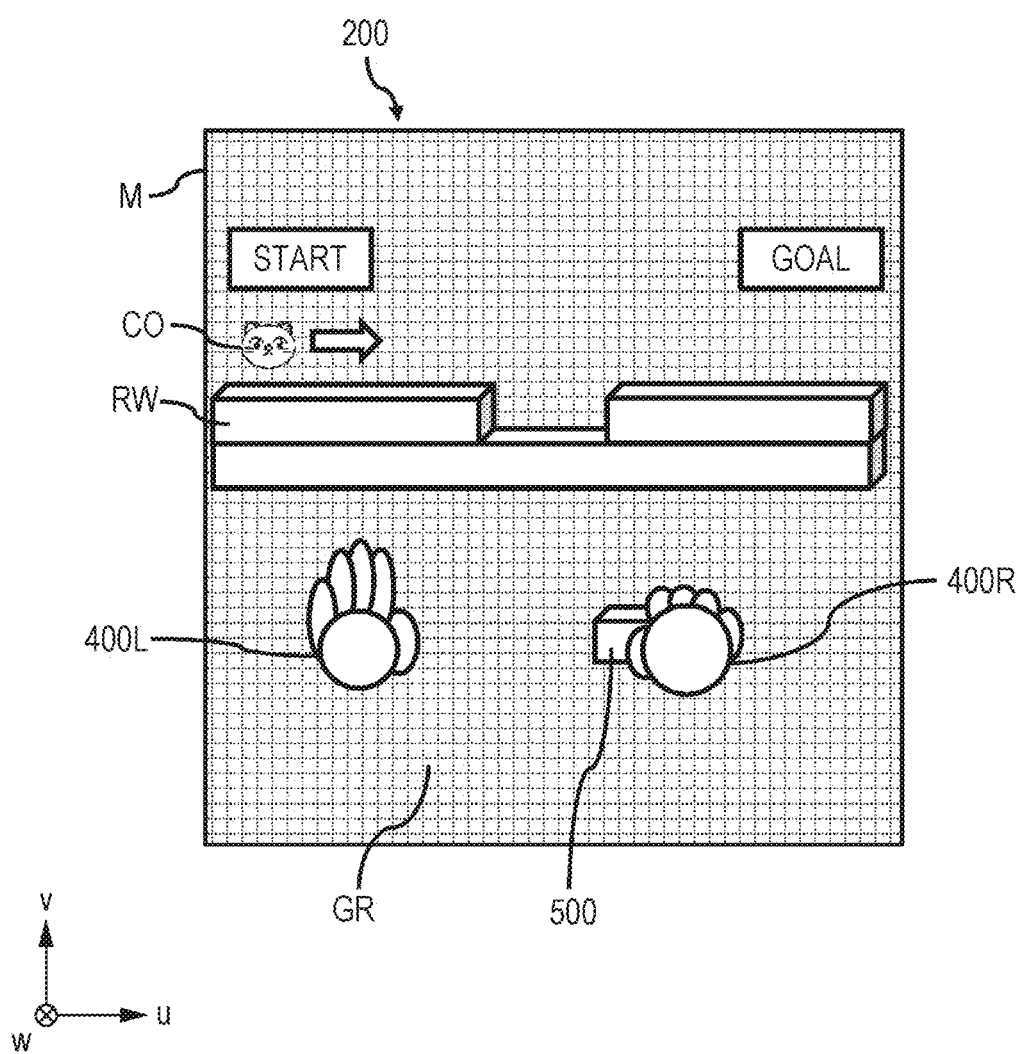
FIG. 8 A diagram of an example of the visual-field image displayed on the HMD according to at least one embodiment of this disclosure.

With reference to FIG. 5 to FIG. 8, processing for displaying the visual-field image on the HMD 110 is described. FIG. 5 is a flowchart of the processing of displaying the visual-field image on the HMD 110 according to at least one embodiment of this disclosure. FIG. 6 is an xyz spatial diagram of an example of a virtual space 200 according to at least one embodiment of this disclosure. FIG. 7A is a yx plane diagram of the virtual space 200 illustrated in FIG. 6 according to at least one embodiment of this disclosure. FIG. 7B is a zx plane diagram of the virtual space 200 illustrated in FIG. 6 according to at least one embodiment, of this disclosure. FIG. 8 is a diagram of an example of a visual-field image M displayed on the HMD 110 according to at least one embodiment of this disclosure.

In FIG. 5, in Step S1, the control unit 121 (refer to FIG. 3) generates virtual space data representing the virtual space 200 including a virtual camera 300 and various objects. In FIG. 6, the virtual space 200 is defined as an entire celestial sphere having a center position 21 as the center (in FIG. 6, only the upper-half celestial sphere is shown for clarity). Further, in the virtual space 200, an xyz coordinate system having the center position 21 as the origin is set. The virtual camera 300 defines a visual axis L for identifying the visual-field image M (refer to FIG. 8) to be displayed on the HMD 110. The uvw coordinate system that defines the visual field of the virtual camera 300 is determined so as to synchronize with the uvw coordinate system that is defined about the head of the user U in the real space. Further, the control unit 121 may move the virtual camera 300 in the virtual space 200 in synchronization with the movement in the real space of the user U wearing the HMD 110. Further, the various objects in the virtual space 200 include, for example, a left hand object 400L, a right, hand object 400R, and a target object 500 (refer to FIG. 8 and FIG. 9).

In Step S2, the control unit 121 identifies a visual field CV (refer to FIG. 7) of the virtual camera 300. Specifically, the control unit 121 acquires information relating to a position and an inclination of the HMD 110 based on data representing the state of the HMD 110, which is transmitted from, the position sensor 130 and/or the HMD sensor 114. Next, the control unit 121 identifies the position and the direction of the virtual camera 300 in the virtual space 200 based on the information relating to the position and the inclination of the HMD 110. Next, the control unit 121 determines the visual axis L of the virtual camera 300 based on the position and the direction of the virtual camera 300, and identifies the visual field CV of the virtual camera 300 based on the determined visual axis L. In this case, the visual field CV of the virtual camera 300 corresponds to a part of the region of the virtual space 200 that can be visually recognized by the user U wearing the HMD 110. In other words, the visual field CV corresponds to a part of the region of the virtual space 200 to be displayed on the HMD 110. Further, the visual field CV has a first region CVa set as an angular range of a polar angle α about the visual axis L in the xy plane in FIG. 7A, and a second region CVb set as an angular range of an azimuth B about the visual axis L in the xz plane in FIG. 7B. The control unit 121 may identify the line-of-sight direction of the user U based on data representing the line-of-sight direction of the user U, which is transmitted from the eye gaze sensor 140, and may determine the direction of the virtual camera 300 based on the line-of-sight direction of the user U.

The control unit 121 can identify the visual field CV of the virtual camera 300 based on the data transmitted from the position sensor 130 and/or the HMD sensor 114. In this case, when the user U wearing the HMD 110 moves, the control unit 121 can change the visual field CV of the virtual camera 300 based on the data representing the movement of the HMD 110, which is transmitted from the position sensor 130 and/or the HMD sensor 114. That is, the control unit 121 can change the visual field CV in accordance with the movement of the HMD 110. Similarly, when the line-of-sight direction of the user U changes, the control unit 121 can move the visual field CV of the virtual camera 300 based on the data representing the line-of-sight direction of the user U, which is transmitted from the eye gaze sensor 140. That is, the control unit 121 can change the visual field CV in accordance with the change in the line-of-sight direction of the user U.

In Step S3, the control unit 121 generates visual-field image data representing the visual-field image M to be displayed on the display unit 112 of the HMD 110. Specifically, the control unit 121 generates the visual-field image data based on the virtual space data defining the virtual space 200 and the visual field CV of the virtual camera 300.

In Step S4, the control unit 121 displays the visual-field image M on the display unit 112 of the HMD 110 based on the visual-field image data (refer to FIG. 8). As described above, the visual field CV of the virtual camera 300 is updated in accordance with the movement of the user U wearing the HMD 110, and thus the visual-field image M to be displayed on the display unit 112 of the HMD 110 is updated as well. Thus, the user U can be immersed in the virtual space 200.

The virtual camera 300 may include a left-eye virtual camera and a right-eye virtual camera. In this case, the control unit 121 generates left-eye visual-field image data representing a left-eye visual-field image based on the virtual space data and the visual field of the left-eye virtual camera. Further, the control unit 121 generates right-eye visual-field image data representing a right-eye visual-field image based on the virtual space data and the visual field of the right-eye virtual camera. After that, the control unit 121 displays the left-eye visual-field image and the right-eye visual-field image on the display unit 112 of the HMD 110 based on the left-eye visual-field image data and the right-eye visual-field image data. In this manner, the user U can visually recognize the visual-field image as a three-dimensional image from, the left-eye visual-field image and the right-eye visual-field image. In this disclosure, for the sake of convenience in description, the number of the virtual cameras 300 is one. However, at least one embodiment of this disclosure is also applicable to a case in which the number of the virtual cameras is two.

Figure 9B:
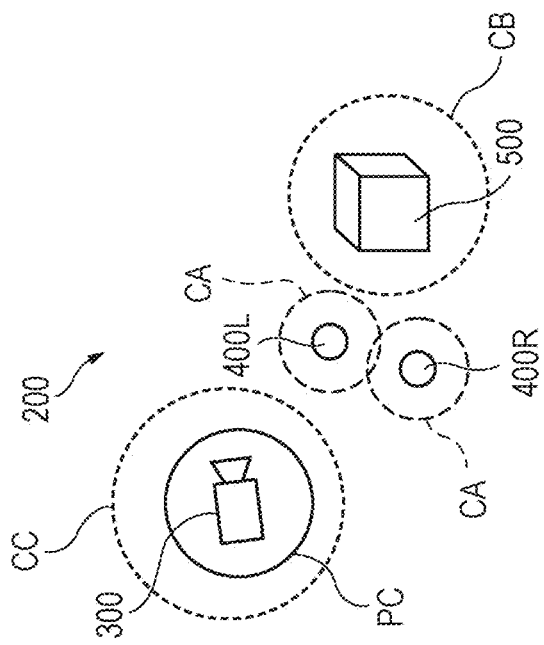
FIG. 9B A diagram of the virtual space including a virtual camera, a hand object, and a target object according to at least one embodiment of this disclosure.
Figure 9A:
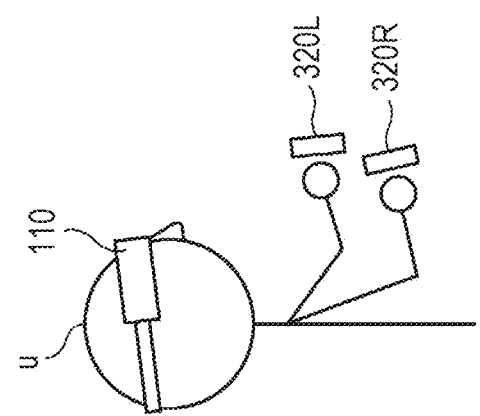
FIG. 9A A diagram of a user wearing the HMD and the external controller according to at least one embodiment of this disclosure.

Now, a description is given of the left hand object 400L, the right hand object 400R, and the target object 500 included in the virtual space 200 with reference to FIGS. 9A-9B. FIG. 9A is a diagram of the user U wearing the HMD 110 and the controllers 320L and 320R according to at least one embodiment of this disclosure. FIG. 9B is a diagram, of the virtual space 200 including the virtual camera 300, the right hand object 400R (example of a first operation object), the left hand object 400L (example of a second operation object), and the target object 500 according to at least one embodiment of this disclosure.

In FIG. 9B, the virtual space 200 includes the virtual camera 300, a player character PC, the left hand object 400L, the right hand object 400R, and the target object 500. The control unit 121 generates the virtual space data for defining the virtual space 200 including those objects. As described above, the virtual camera 300 is synchronized with the movement of the HMD 110 worn by the user U. That is, the visual field of the virtual camera 300 is updated based on the movement of the HMD 110. The right hand object 400R is the first operation object configured to move in accordance with movement of the controller 320R worn on the right hand (first part of the body) of the user U. The left hand object 400L is the second operation object configured to move in accordance with movement of the controller 320L worn on the left hand (second part of the body) of the user U. In the following, the left hand object 400L and the right hand object 400R may simply be referred to as "hand object 400" for the sake of convenience of description.

The left hand object 400L and the right hand object 400R each have a collision area CA. The target object 500 has a collision area CB. The player character PC has a collision area CC. The collision areas CA, CB, and CC are used for determination of collision (determination of hit) between the respective objects. For example, when the collision area CA of the hand object 400 and the collision area CB of the target object 500 have touched each other, a determination is made that the hand object 400 and the target object 500 have touched each other. Further, when the collision area CC of the player character PC and the collision area CB of the target object 500 have touched each other, a determination is made that the player character PC and the target object 500 have touched each other. In FIG. 9B, each of the collision areas CA to CC may be defined by a sphere having a diameter R assuming that a coordinate position set for each object is the center.

The target object 500 can be moved by the left hand object 400L and the right hand object 400R. A game configured so that, in the virtual space 200 in FIG. 8, a character object CO is automatically moved on a passage RW from a start point to a goal point is described as an example. A pit part is provided on the passage RW, and the character object CO may fall into the pit on its way to the goal point to fail to reach the goal point, which brings the game to an end. The user can lead the character object CO to the goal point by operating the hand object 400 to operate the target object 500 so as to cover the above-mentioned pit with the target object 500.

As described later, coordinate information for defining an arrangement position in an xyz space is set for the target object 500. A grid GR is set in the virtual space 200 in association with an xyz space coordinate system. The user can select the target object 500 by causing the hand object 400 to touch the target object 500 (a gripping action may be performed), and move the target object 500 by moving the hand object 400 touching the target object 500 in the selected state, to thereby change the coordinate information on the target object 500. When the user cancels the selection of the target object 500 using the hand object 400 (such an action as to release the gripping hand may be performed), the target object 500 is arranged at a grid location nearest to the coordinates of the target object 500 at a time of the cancellation.

In at least one embodiment, an initial shape of the target object 500 is set so that the pit cannot be covered simply by moving the target object 500 to the pit of the passage RW, and as described below, the target object 500 needs to be moved to the pit of the passage RW after changing the shape of the target object 500.

Figure 10:
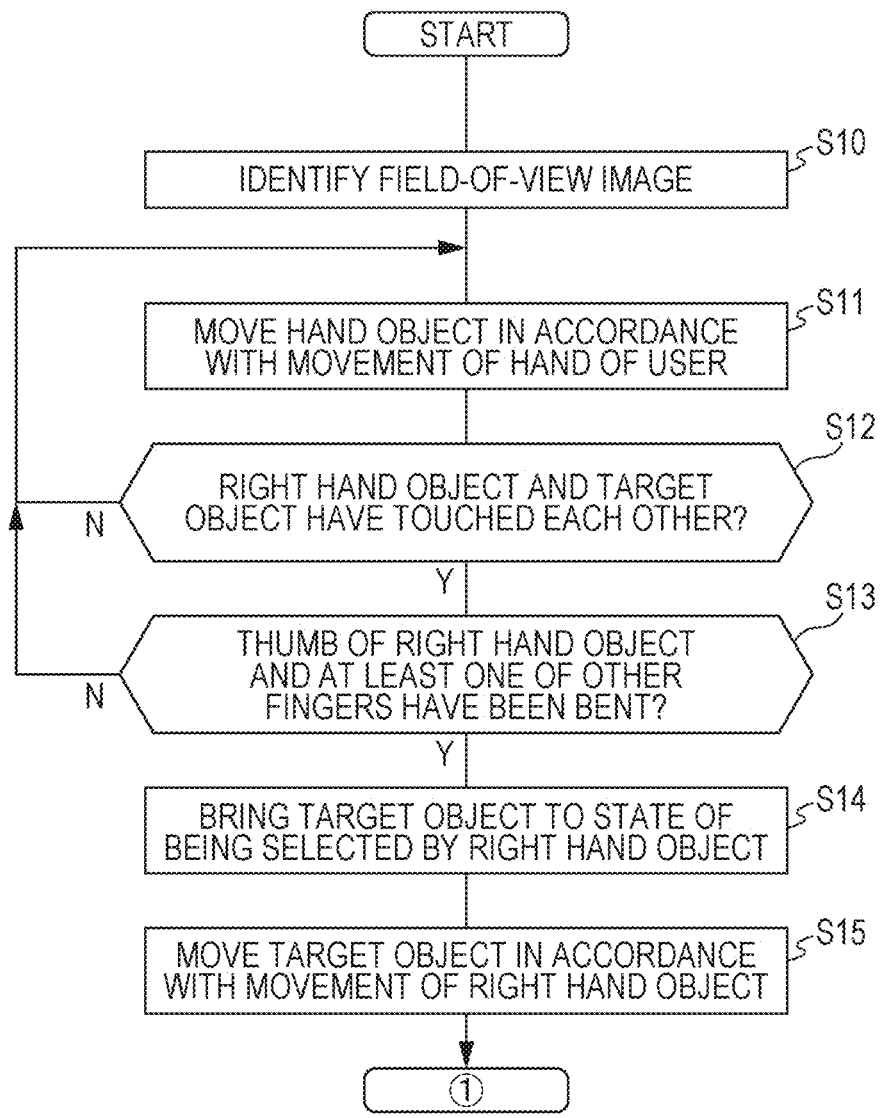
FIG. 10 A flowchart of an information processing method according to at least one embodiment of this disclosure.
Figure 11:
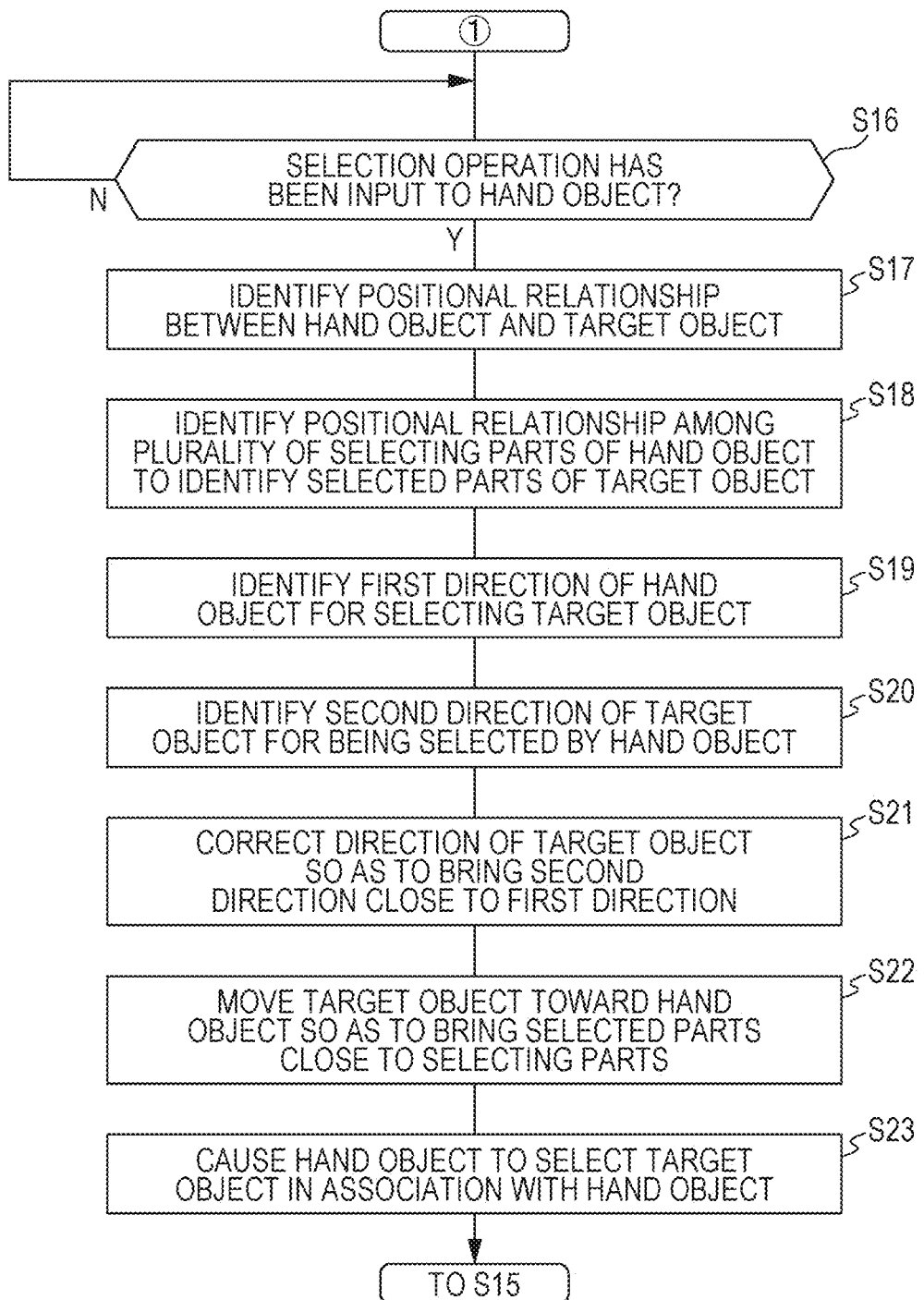
FIG. 11 A flowchart of an information processing method according to at least one embodiment of this disclosure.

An information processing method according to at least one embodiment of this disclosure is described with reference to FIG. 10 to FIG. 16B. FIG. 10, FIG. 11, and FIG. 15 are flowcharts for of the information processing method according to at least one embodiment of this disclosure. FIGS. 12A-12B, FIGS. 13A-13B, FIGS. 14A-14B and FIGS. 16A-16B are diagrams of how the target object 500 is selected by the right hand object 400R according to at least one embodiment of this disclosure.

In FIG. 10, in Step S10, the visual-field image M to be presented on the HMD 110 is identified. In at least one embodiment, as in FIG. 9B, the target object 500 and the hand objects 400L and 400R are present forward of the virtual camera 300. Therefore, as in FIG. 8, the target object 500 and the hand object 400 are displayed within the visual-field image M. The display of the character object CO, the passage RW, or other such object are omitted in the following description.

In Step S11, the control unit 121 moves the hand object 400 as described above based on movement of the hand of the user U, which is detected by the controller 320.

In Step S12, the control unit 121 determines whether or not the target object 500 and the hand object 400 satisfy a predetermined condition. In at least one embodiment, the control unit 121 determines whether or not each of the left hand object 400L and the right hand object 400R has touched the target object 500 based on the collision area CA set to each hand object 400. When each hand object 400 has touched the target object 500, the processing proceeds to Step S13. When each hand object 400 does not touch the target object 500, the control unit 121 waits for information on movement of the hand of the user again, and continues to control movement of the hand object 400.

In Step S13, the control unit 121 determines whether or not a movement for selecting the target object 500 has been input to the hand object 400. In at least one embodiment, the hand object 400 includes a plurality of selecting parts for selecting the target object 500. In particular, in at least one embodiment, when the target object 500 is selected by the hand object 400 or other such virtual hand, the target object 500 be selected by the virtual hand through the gripping action. Therefore, as in, for example, FIGS. 12A-12B, the plurality of selecting parts include a thumb 410R of the right hand object 400R and an opposing finger 420R including at least one of the other fingers. In Step S13, the control unit 121 determines whether or not the thumb of the hand object 400 and at least one of the other fingers have been bent. Specifically, the control unit 121 determines whether or not a movement of the right hand object 400R includes a movement for moving the thumb 410R and the opposing finger 420R from a first position being a stretched state to a second position being a bent state.

In Step S14, the control unit 121 brings the target object 500 to a state of being selected by the right hand object 400R. In at least one embodiment, in response to a determination that the right hand object 400R and the target object 500 have touched each other and the respective fingers of the right hand object 400R are bent by such an operation as described above, the target object 500 is brought to the state of being selected by being gripped by the right hand object 400R.

In Step S15, the control unit 121 moves the target object 500 in accordance with the movement of the hand object 400 with the target object 500 being selected. With this, the user U can enjoy such a virtual experience as to be able to operate the target object 500 by the virtual hand 400 at will.

In at least one embodiment, in order to improve the virtual experience of the user in addition to such control performed on the target object 500 by the virtual hand 400, the following method is executed by the control unit 121. First, in Step S16, in the same manner as in Step S13, the control unit 121 determines whether or not the operation for selecting the target object 500 has been input to the hand object 400 by the user. In response to a determination that the operation has been input, the processing proceeds to Step S17, and in response to a determination that the operation has not been input, the control unit 121 continues to wait for the above-mentioned selection operation.

In Step S17, the control unit 121 identifies a positional relationship between the hand object 400 and the target object 500. In this embodiment, the positional relationship is identified based on the positions of the hand object 400 and the target object 500 and/or information relating to the directions of the hand object 400 and the target object 500.

Figure 12A:
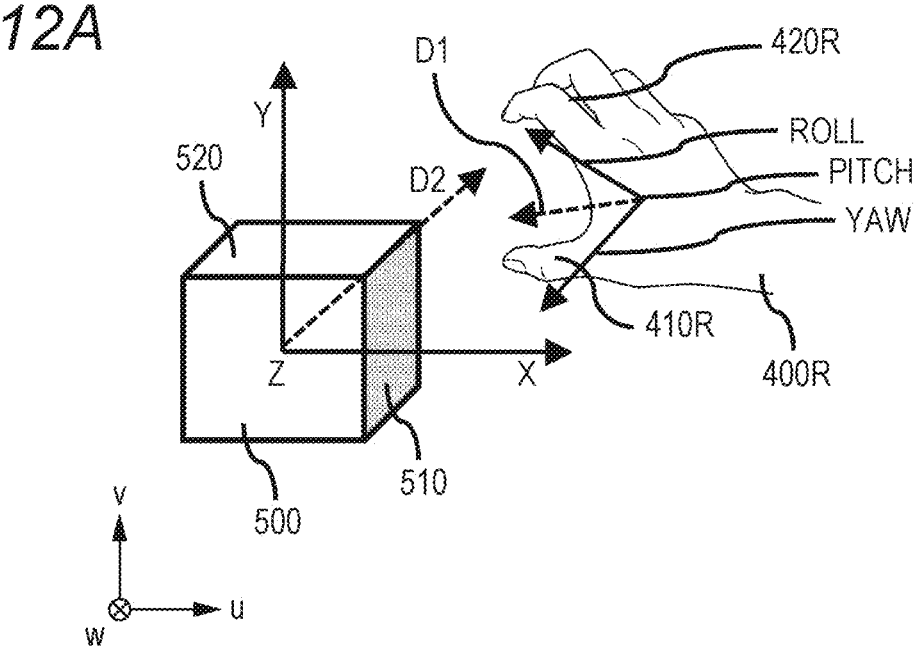
FIGS. 12A-12B Diagram of how a target object 500 is selected by a right hand object 400R according to at least one embodiment of this disclosure.
Figure 12B:
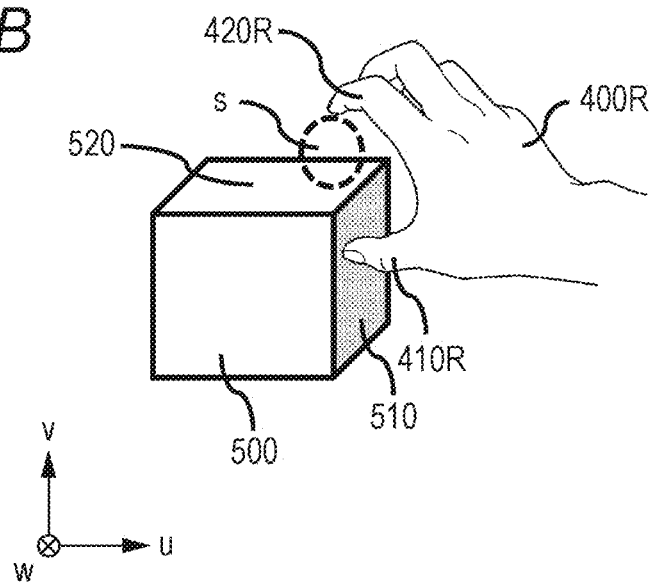

In FIG. 12A, the position of the hand object 400 is identified based on the coordinate information in the virtual space 200, which is set for the hand object 400. The direction of the hand object 400 is defined based on a three-axis coordinate system having the coordinates set for the hand object 400 as the origin. The coordinate information on the hand object 400 and the coordinate system therefor are identified based on the movement of the hand of the user U as in FIGS. 4A-4B.

In FIG. 12A, the position of the target object 500 is identified based on the coordinate information in the virtual space 200, which is set for the target object 500. The direction of the target object 500 is defined based on a three-axis coordinate system having the coordinates set for the target object 500 as the origin. The coordinate information on the target object 500 and the coordinate system therefor are identified based on the virtual space data.

In Step S18, the control unit 121 identifies the positional relationship among the plurality of selecting parts of the hand object 400 to identify selected parts of the target object 500. In FIG. 12A, parts of the target object 500 suitable to be selected by the thumb 410R and the opposing finger 420R of the right hand object 400R are identified as the selected parts. In at least one embodiment, the right hand object 400R exists at the top right of the target object 500 on the front side, and hence a right side surface 510 of the target object 500 can be identified as the selected part for being selected by the thumb 410R. Further, a top side surface 520 of the target object 500 can be identified as the selected part for being selected by the opposing finger 420R.

In at least one embodiment, the selected parts of the target, object 500 are identified based on the positional relationship among the plurality of selecting parts of the hand object 400. For example, when the right hand object 400R exists above the front side of the target object 500, a front side surface of the target object 500 can be identified as the selected part for being selected by the thumb 410R, and the top side surface 520 of the target object 500 can be identified as the selected part for being selected by the opposing finger 420R.

In Step S19, the control unit 121 identifies a first direction D1 of the hand object 400 for selecting the target object 500. In at least one embodiment, the first direction is appropriately set based on a form of an operation object. In at least one embodiment, a direction toward space between the thumb 410R and the opposing finger 420R in the three-axis coordinate system set for the right hand object 400R is identified as the first direction D1. With this, providing the user with an intuitive interaction with the target object is possible. In at least one embodiment, setting a roll axis, a pitch axis, and a yaw axis in the three-axis coordinate system set for the right hand object 400R as reference vectors, and to combine the reference vectors so as to be employed as another reference vector for defining the first direction is possible.

In Step S20, the control unit 121 identifies a second direction D2 of the target object 500 for being selected by the hand object 400. In at least one embodiment, the second direction is identified based on the selected parts 510 and 520 of the target object 500 identified as described above. Specifically, normal vectors of the selected parts 510 and 520 can be combined to be employed as a reference vector for defining the second direction D2.

In Step S21, the control unit 121 corrects the direction of the target object 500 so as to bring the second direction D2 close to the first direction D1. In at least one embodiment, unless the above-mentioned correction is performed, as in FIG. 12B, the target object 500 can be selected by the hand object 400 under a state in which the positional relationship between the hand object 400 and the target object 500 is inappropriate. Specifically, the target object 500 can be selected by the hand object 400 under a state in which there is space S between the opposing finger 420R and the top side surface 520 while the thumb 410R has touched the right side surface 510. In some instances, the user may feel strange when the target object 500 is moved by the hand object 400 in the above-mentioned case.

Figure 13A:
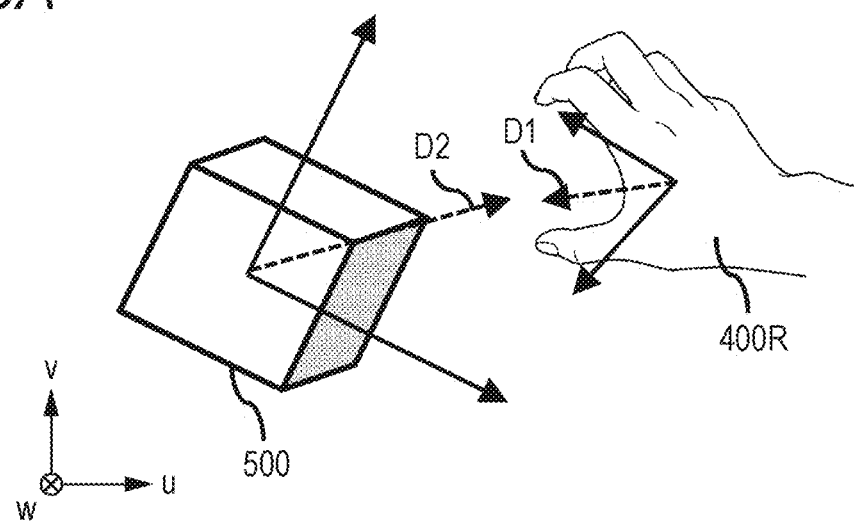
FIGS. 13A-13B Diagrams of how the target object 500 is selected by the right hand object 400R according to at least one embodiment of this disclosure.
Figure 13B:
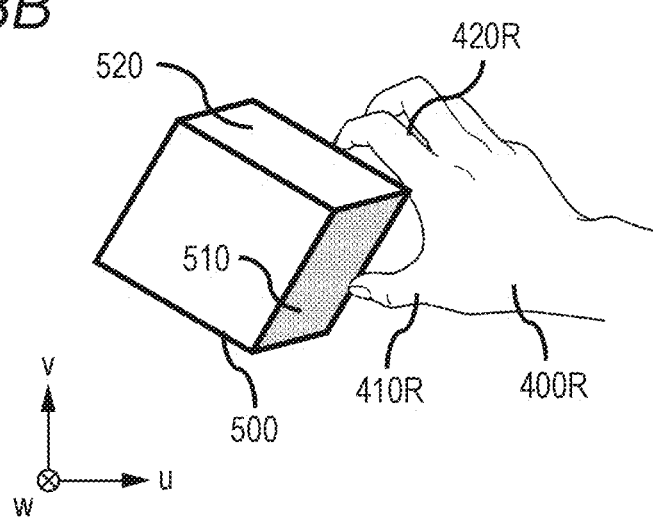

In contrast, FIG. 13A includes the positional relationship between the target object 500 and the hand object 400 exhibited when the above-mentioned correction is performed. Unlike in FIG. 12A, the direction of the target object 500 is corrected so as to bring the second direction D2 close to the first direction D1. Specifically, in at least one embodiment, the direction of the target object 500 is corrected so that an angle formed between the first direction D1 and the second direction D2 is brought close to any one of 0° and 180°, and the direction of the target object 500 is corrected so as to be brought close to a direction having the angle of any one of 0° and 180° that is closer to the second direction before the correction. In at least one embodiment, the direction of the target object 500 is corrected so that the angle formed between the first direction D1 and the second direction D2 is brought close to 180°. With this, as in FIG. 13B, preventing space from being formed between the selecting parts 410R and 420R of the hand object 400 and the selected parts 510 and 520 of the target object 500 is possible. With this, when selecting the target object by moving a part of the body, the user can select the target object without feeling strange even when the positional relationship is not accurately adjusted. Therefore, an interaction between the user and a virtual object can be improved, and the virtual experience to be provided to the user can be improved.

In Step S22, the control unit 121 may move the target object 500 toward the hand object 400 so as to bring the selected parts 510 and 520 close to the selecting parts 410R and 420R. With this, when selecting the target object by moving a part of the body, the user can select the target object without feeling strange even when the positional relationship is not accurately adjusted. Therefore, the interaction between the user and the virtual object can be improved, and the virtual experience to be provided to the user can be improved. In this case, in at least one embodiment, the target object 500 is moved along the second direction D2 of the target object 500 having the direction corrected. With this, the control unit 121 can move the target object 500 toward the hand object 400 so as to help prevent the user from feeling strange.

In Step S23, the control unit 121 causes the hand object 400 to select the target object 500 in association with the hand object 400. With this, as in FIG. 13B, the target object 500 can be selected by the hand object 400 without a strange feeling under a state in which the selected parts 510 and 520 are touched by the selecting parts 410R and 420R. After that, the processing returns to Step S15, and the movement of the target object 500 is operated in accordance with the movement of the hand object 400.

Figure 14A:
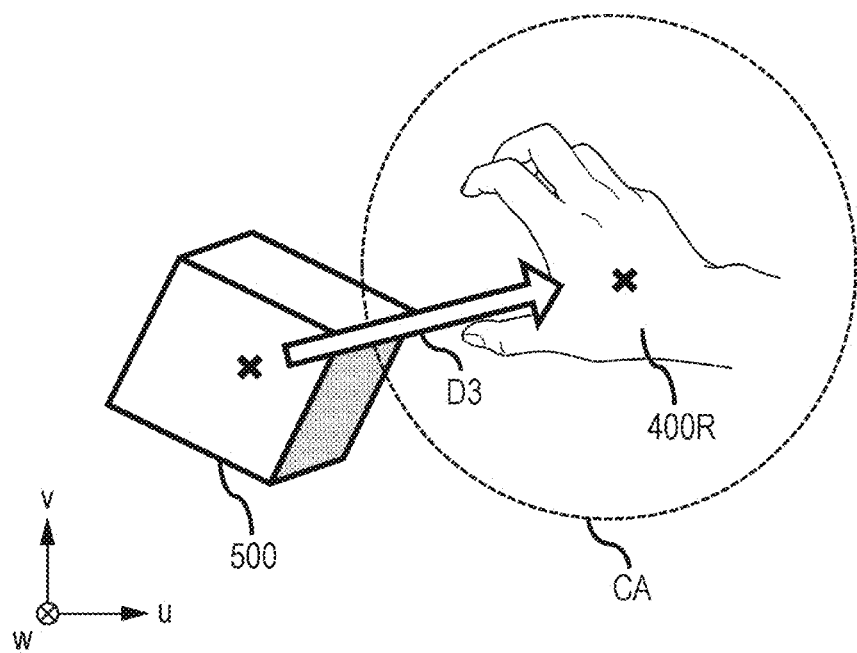
FIGS. 14A-14B Diagrams of how the target object 500 is selected by the right hand object 400R according to at least one embodiment of this disclosure.
Figure 14B:
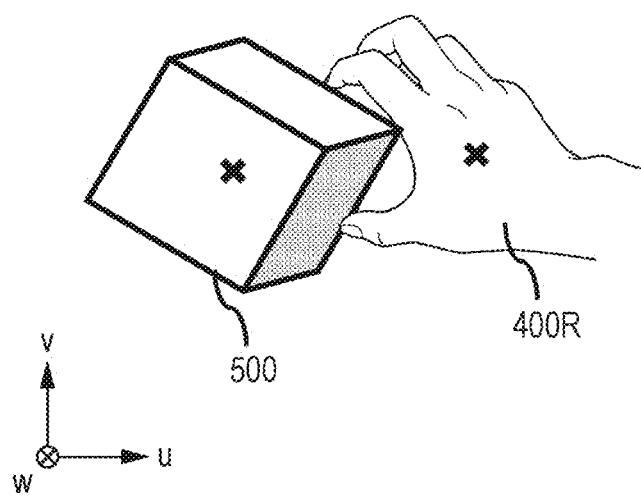
Figure 15:
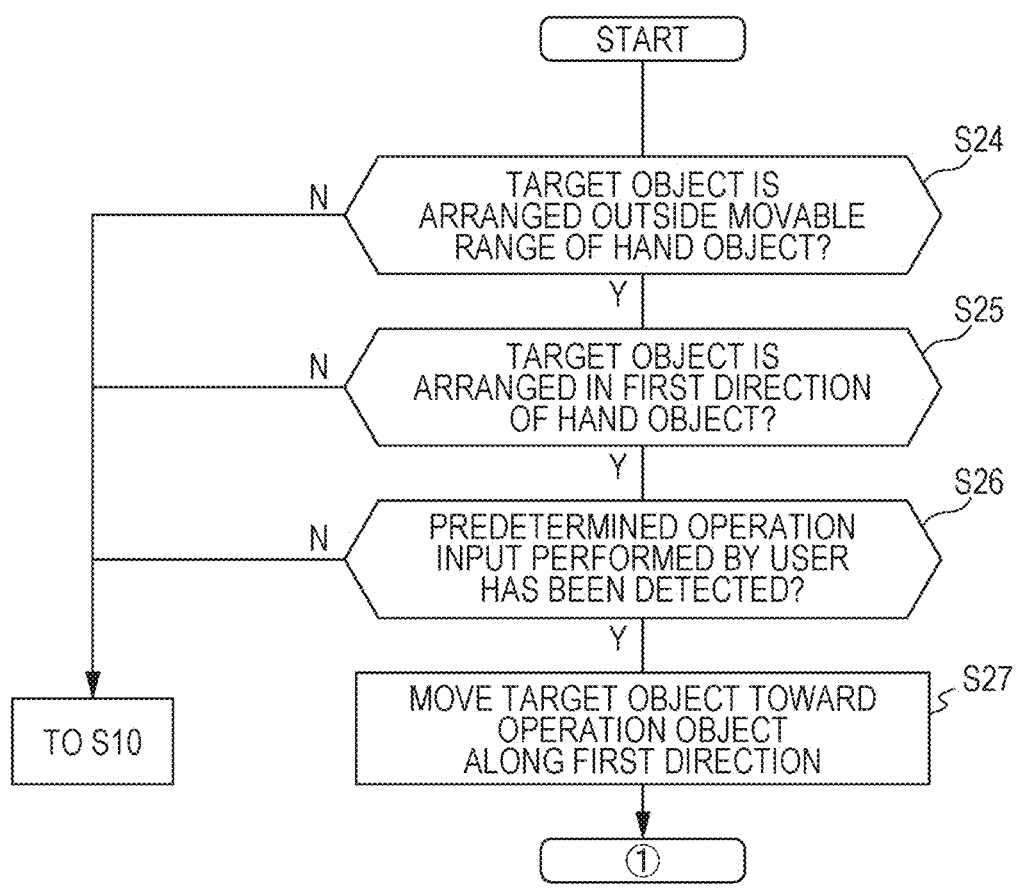
FIG. 15 A flowchart of an information processing method according to at least one embodiment of this disclosure.
Figure 16A:
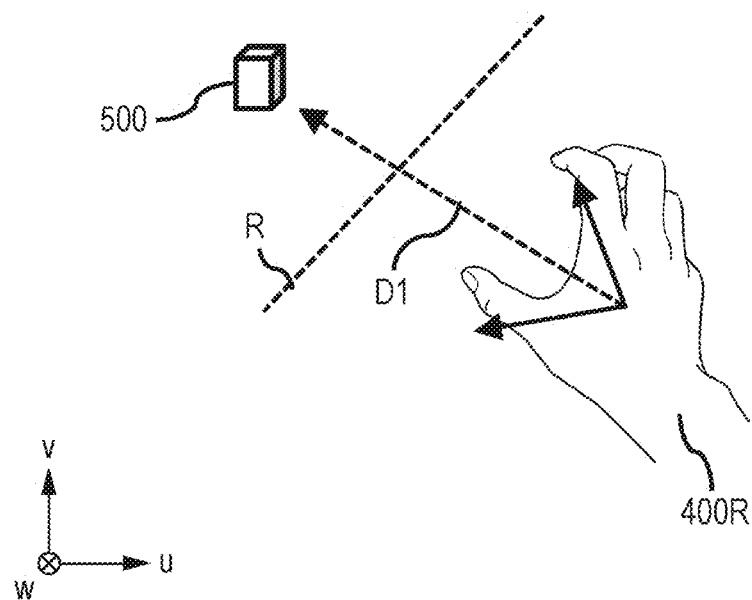
FIGS. 16A-16B Diagrams of how the target object 500 is selected by the right hand object 400R according to at least one embodiment of this disclosure.
Figure 16B:
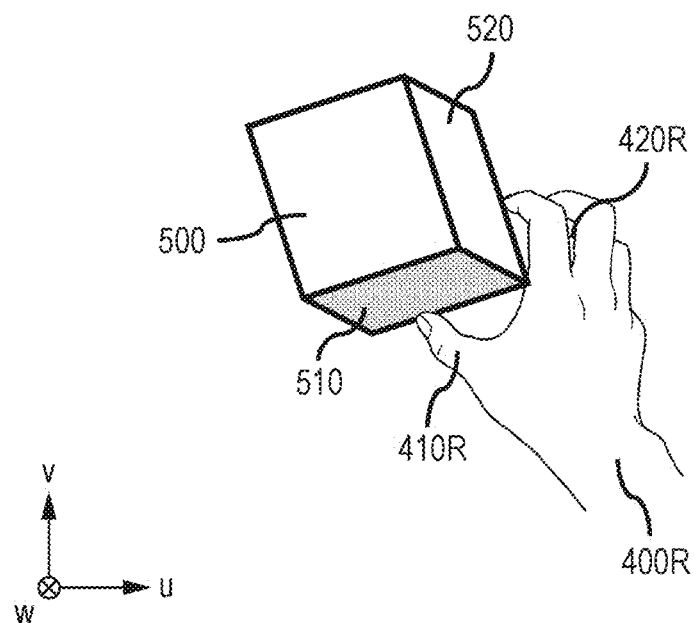

When the target, object 500 is moved toward the hand object 400, as in FIGS. 14A-14B, a movement direction D3 may be identified based on the coordinate information on the target object 500 and the hand object 400 in the virtual space 200. In this case, when the selection operation is input to the hand object 400 after a determination that the target object 500 and the hand object 400 have touched each other, the movement direction D3 can be easily identified based on the coordinate information on the target object 500 and the hand object 400. With this, when the control unit 121 controls the target object 500, reducing a processing load on the processor is possible Further, as in FIG. 14A, the size of the collision area CA set for the virtual hand 400 may be changed depending on the moving speed of the virtual hand 400 (or moving speed of the hand of the user detected by the detection unit). For example, in at least one embodiment, the size of the collision area CA set for the virtual hand 400 is enlarged as the moving speed of the virtual hand 400 increases. With this, the user can be provided with a more intuitive virtual experience. As the user moves his or her hand faster, the difficulty for the user to adjust the positional relationship between the target object 500 and the hand object 400 increases. In that case, the difficulty of selection of the target object 500 is adjusted depending on the moving speed of the virtual hand 400, to thereby be able to provide the user with a more intuitive virtual experience.

The control unit 121 may be configured to be capable of operating the target object 500 arranged outside a movable range of the hand object 400 as well. Such processing described with respect to in FIG. 15 and FIGS. 16A-16B.

In Step S24, the control unit 121 determines whether or not the target object 500 is arranged outside the movable range R of the hand object 400. When the target object 500 is arranged outside the movable range R, the processing proceeds to Step S25, and when the target object 500 is not arranged outside the movable range R, returns to Step S10. In at least one embodiment, the movable range R is set to have a spherical shape having the virtual camera 300 as the center and a predetermined distance as the radius. In at least one embodiment, the movable range R is set so that a distance between the HMD 110 and the controller 320 falls within a general distance between the head and the hand of the user. Further, the distance between the HMD 110 and the controller 320 may be measured within a predetermined time period, and the maximum value of the distance measured within the predetermined time period may be set as the movable range R, to thereby set the movable range R suitable for the user.

In Step S25, the control unit 121 determines whether or not the target object 500 is arranged in the first direction D1 of the hand object 400. The control unit 121 performs the determination based on whether or not an extension line of the first direction D1 collides with the collision area CB of the target object 500. When the determination results in "Yes", the processing proceeds to Step S26, and when the determination results in "No", the processing returns to Step S10.

In Step S26, the control unit 121 determines whether or not predetermined operation input performed by the user has been detected. The predetermined operation input may be an operation for selecting the target object 500 which is performed by the hand object 400 as described above. Further, the predetermined operation input may be a predetermined operation (long-press operation) performed on a predetermined button provided to the controller 320. When the determination results in "Yes", the processing proceeds to Step S27, when the determination results in "No", the processing returns to Step S10.

In Step S27, the control unit 121 moves the target object 500 toward the hand object 400 along the first direction D1. With this, as in FIG. 16B, the user can easily select the target object 500 arranged outside the movable range R, and operate the target object 500 by the hand object.

Figure 17:
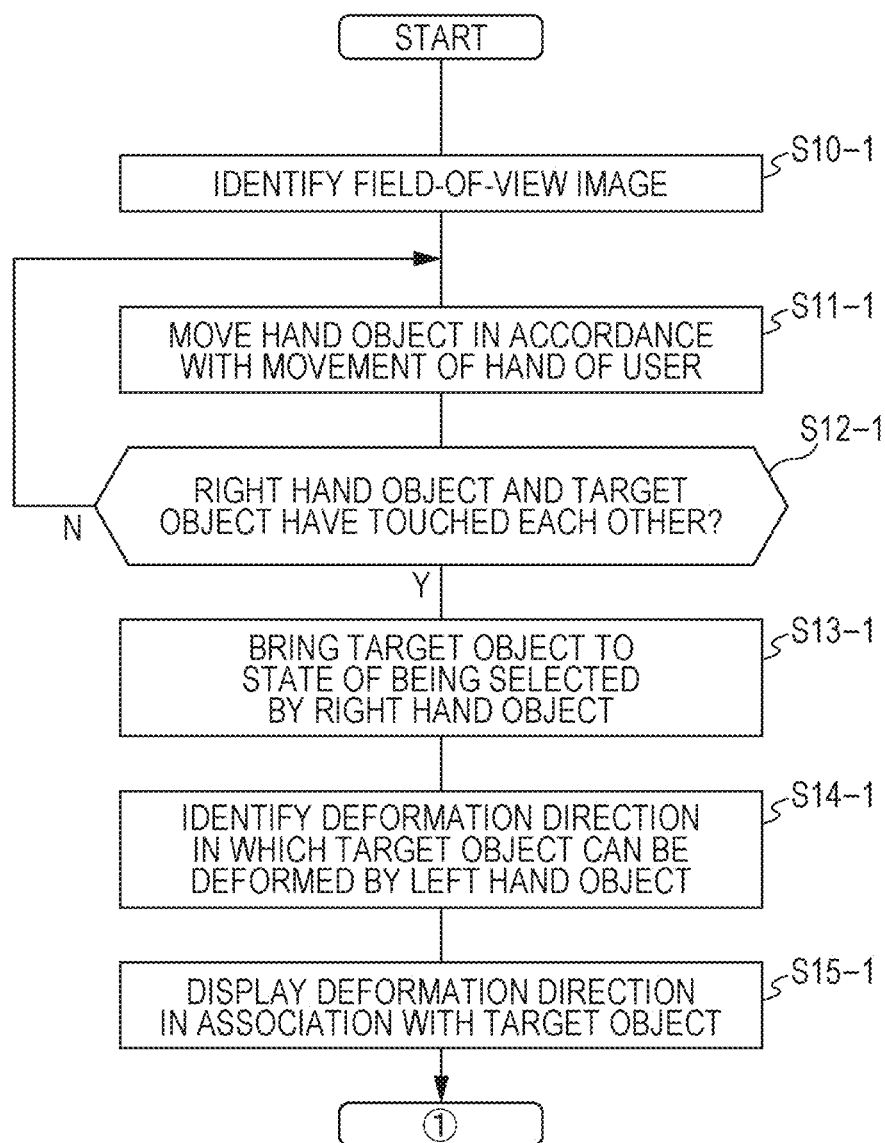
FIG. 17 A flowchart of an information processing method according to at least one embodiment of this disclosure.
Figure 18:
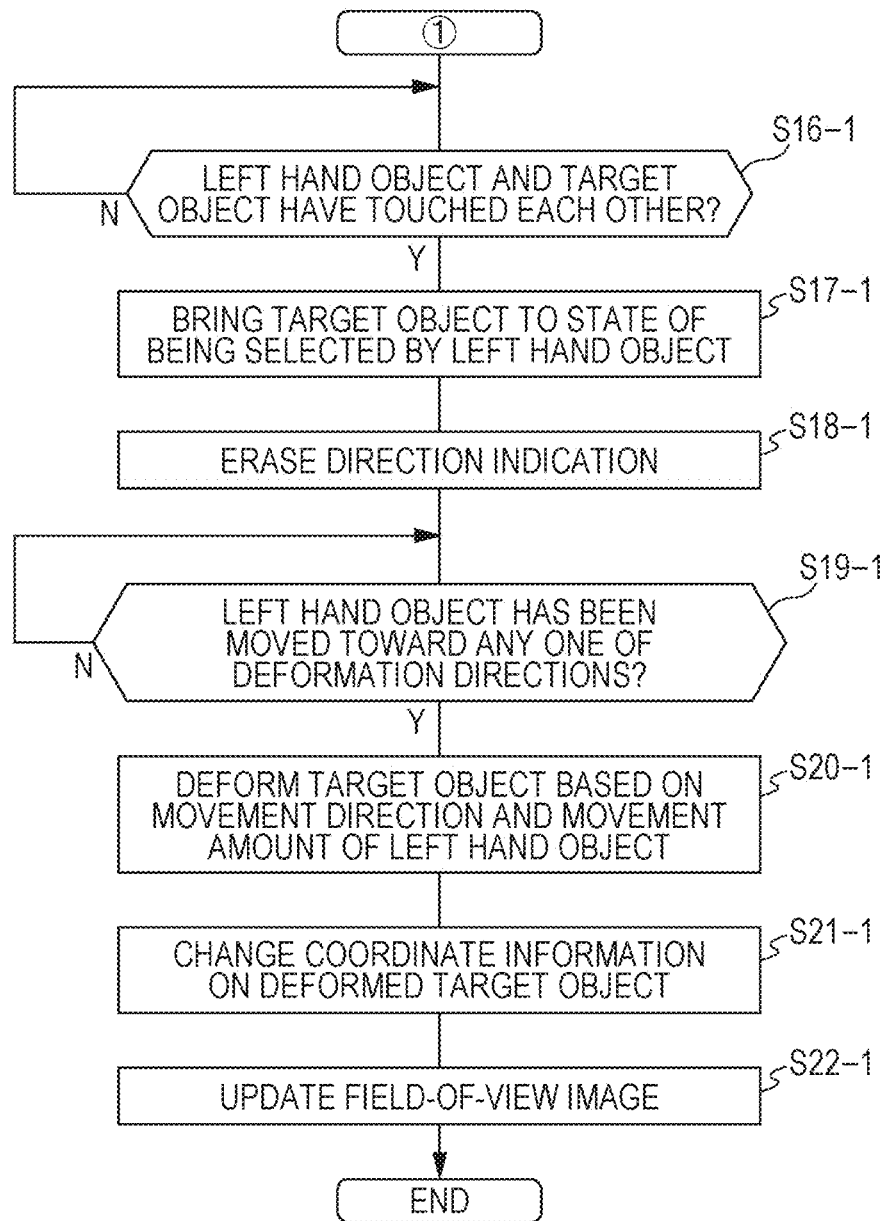
FIG. 18 A flowchart of an information processing method according to at least one embodiment of this disclosure.
Figure 21:
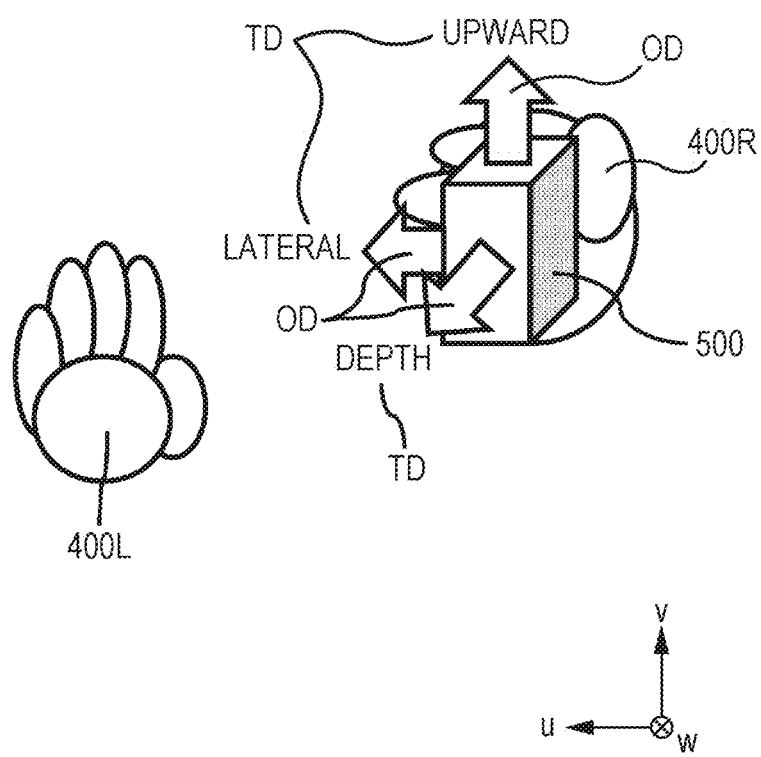
FIG. 21 A diagram of how a direction of the target object 500 has been changed by moving the right hand object 400R after the target object 500 is selected by the right hand object 400R according to at least one embodiment of this disclosure.
Figure 22:
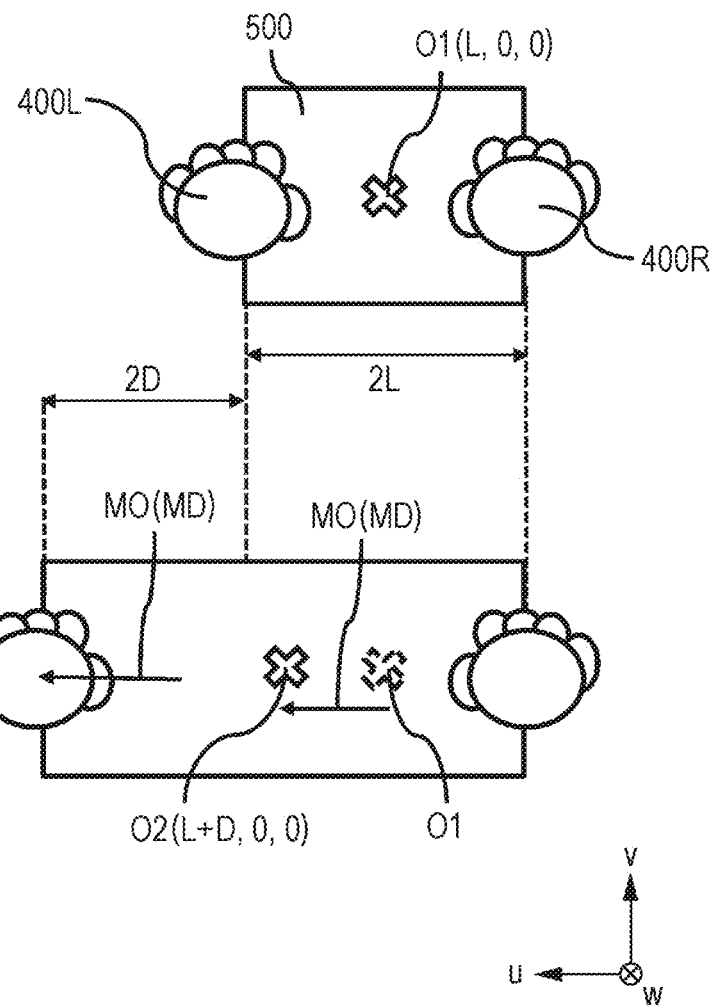
FIGS. 22A-22B Diagrams of a change in coordinate information on the target object 500 before and after deformation of the target object 500 according to at least one embodiment of this disclosure.
Figure 23:
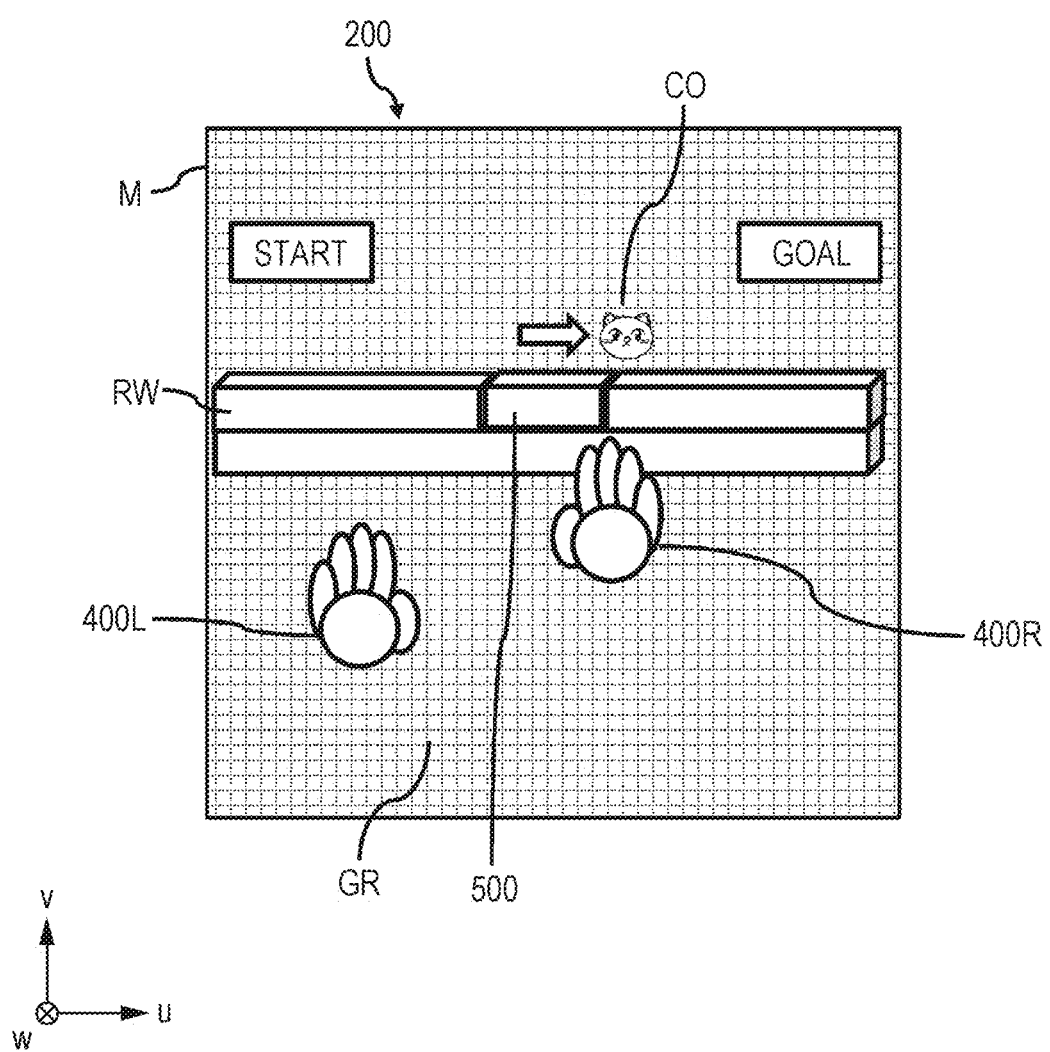
FIG. 23 A diagram of an example of the visual-field image displayed on the HMD according to at least one embodiment of this disclosure.

An information processing method according to at least one embodiment of this disclosure is described with reference to FIG. 17 to FIG. 23. FIG. 17 and FIG. 18 are flowcharts of the information processing method according to at least one embodiment of this disclosure. FIGS. 19A-19C and FIGS. 20A-20C are diagrams of how the target object 500 selected by the right hand object 400R is deformed by the left hand object 400L according to at least one embodiment of this disclosure. FIG. 21 is a diagram, of how the direction of the target object 500 has been changed by moving the right hand object 400R after the target object 500 is selected by the right hand object 400R according to at least one embodiment of this disclosure. FIGS. 22A-22B are diagrams of a change in coordinate information on the target object 500 before and after deformation of the target object 500 according to at least one embodiment of this disclosure. FIG. 23 is a diagram of how the character object CO has been successfully guided to the goal point through use of the deformed target object 500 according to at least one embodiment of this disclosure.

In FIG. 17, in Step S10-1, a visual-field image to be presented on the HMD 110 is identified. In at least one embodiment, as in FIG. 9B, the target object 500 and the hand objects 400L and 400R are present forward of the virtual camera 300. Therefore, as in FIG. 8, the target object 500 and the hand object 400 are displayed within the visual-field image M. The display of the character object CO, the passage RW, or other such object are omitted in FIG. 9B and FIGS. 19A-19C to FIGS. 22A-22B.

In Step S11-1, the control unit 121 moves the hand object 400 as described above based on movement of the hand of the user U, which is detected by the controller 320.

In Step S12-1, the control unit 121 determines whether or not the target object 500 and the first operation object 400 satisfy a predetermined condition. In at least one embodiment, the control unit 121 determines whether or not each of the left hand object 400L and the right hand object 400R has touched the target object 500 based on the collision area CA set to each hand object 400, When each hand object 400 has touched the target object 500, the processing proceeds to Step S13-1. When each hand object 400 does not touch the target object 500, the control unit 121 waits for information on movement of the hand of the user again, and continues to control movement of the hand object 400.

In Step S13-1, the control unit 121 brings the target object 500, which has been touched by the first operation object 400, to the state of being selected. In at least one embodiment, in FIG. 19A, in response to a determination that the right hand object 400R and the target object 500 have touched each other and the respective fingers of the right hand object 400R are bent by such an operation as described above, the target object 500 is brought to the state of being selected by being gripped by the right hand object 400R.

In Step S14-1, the control unit 121 identifies a deformation direction in which the target object 500 can be deformed in accordance with the movement of the left, hand object 400L (second operation object). In at least one embodiment, as in FIG. 19A, an upward direction, a lateral direction (leftward direction), and a depth direction (not shown) of the target object 500 are identified as deformation directions TD. When the user U operates the right hand to select the target object 500 by the right hand object 400R, the user U becomes ready to operate the left hand to deform the target object 500 by the left hand object 400L as described later. Therefore, the deformation direction TD of the target object 500 is limited to a dimension that facilitates the operation to be performed by the user, to thereby be able to reduce a processing load on a computer without impairing the virtual experience of the user.

Figure 19A:
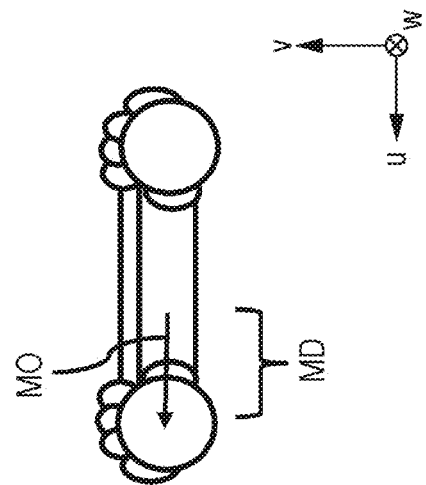
FIGS. 19A-19C Diagrams of how the target object 500 selected by the right hand object 400R is deformed by a left hand object 400L according to at least one embodiment of this disclosure.

In at least one embodiment, the deformation direction TD is identified as at least one of the following directions of the target object 500 exhibited when the target object 500 has been selected, that is, the upward direction and/or a downward direction, the depth direction and/or a frontward direction, and the leftward direction in which the target object is not selected by the right hand object 400R (first operation object) in a horizontal direction. In FIG. 19A, as an example, the upward direction, the depth direction, and the leftward direction, which is a direction on a side on which the left hand object 400L exists opposite to the side of the right hand object 400R used for the selection, are identified as the deformation directions TD. When the deformation directions TD are identified, the vertical direction, the lateral direction, and the depth direction of the target object 500 are preferred to be identified based on a visual-field coordinate system uvw. A direction orthogonal to a surface (upper surface/lower surface) intersecting a v axis being the vertical direction of the visual-field coordinate system by an angle closest to a right angle is set as the vertical direction of the target object 500, a direction orthogonal to a surface (left surface/right surface) intersecting a u axis being the horizontal direction of the visual-field coordinate system by an angle closest to a right angle is set as the horizontal direction (lateral direction) of the target object 500, and a direction orthogonal to a surface (back surface/front surface) intersecting a w axis being the depth direction of the visual-field coordinate system by an angle closest to a right angle is set as the depth direction (frontward direction) of the target object 500.

In Step S15-1, the control unit 121 displays direction indications OD for presenting the deformation directions to the user in a visually recognizable manner based on the identified deformation direction in association with the target object 500. In FIG. 19A, the direction indications OD are displayed so as to extend from the upper surface, the left, surface, and the back surface of the target object 500, which have been identified based on the visual-field coordinate system uvw as described above, toward the deformation directions TD. With this, a deformation rule for the target object 500 can be clearly presented to the user.

In FIG. 18, in Step S16-1, the control unit 121 determines whether or not the target object 500 and the second operation object 400 have satisfied a predetermined condition. In at least one embodiment, the control unit 121 determines whether or not each of the hand objects 400 and the target object 500 have touched each other based on the collision area CA set for each of the hand objects 400. When each of the hand objects 400 and the target object 500 have touched each other, the processing proceeds to Step S17-1. When each of the hand objects 400 and the target object 500 have not touched each other, the control unit 121 waits for information on the movement of the hand of the user again, and continues to control the movement of the hand object 400.

In Step S17-1, the control unit 121 brings the target object 500, which has been touched by the second operation object 400, to the state of being selected. In at least one embodiment, as in FIG. 19B, in response to a determination that the left hand object 400L and the target object 500 have touched each other and the respective fingers of the left hand object 400L are bent by such an operation as described above, the target object 500 is brought to the state of being selected by being gripped by the left hand object 400L.

Figure 19B:
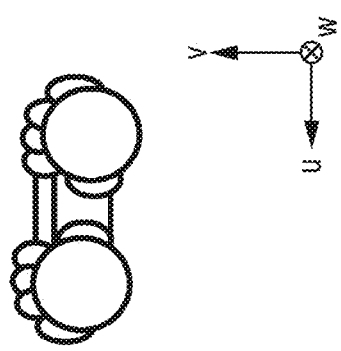
Figure 19C:
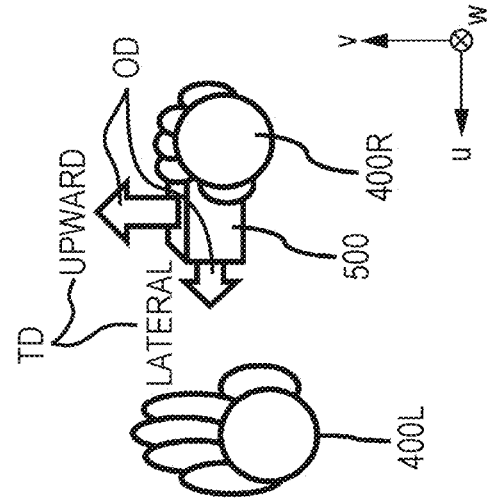

In Step S18-1, when the target object 500 is selected by the left hand object 400L, the control unit 121 erases the direction indication OD as FIG. 19B. At a time when the user U selects the target object 500 by the left hand object 400L, the user U is assumed to have already decided a form to which the target object 500 is to be deformed. Therefore, a time period for displaying a direction indication is reduced without impairing convenience of the user U, to thereby be able to prevent the virtual experience from being interfered with by unnecessary displaying of the direction indication within a field of view of the user.

In Step S19-1, the control unit 121 detects whether or not the left hand object 400L has been moved toward any one of the deformation directions TD with the target object 500 being selected. In response to a detection that the left hand object 400L has moved in any of the deformation directions TD with the target object 500 being selected, the processing proceeds to Step S20-1. In response to a detection that at least one of the left hand object 400L has not moved in any of the deformation directions TD or the target object 500 has not been selected, the control unit 121 continues to wait for the movement of the left hand object 400L.

In Step S20-1, the control unit 121 deforms the target object 500 in accordance with the movement of the left hand object 400L. Specifically, as in FIG. 19C, the control unit 121 deforms the target object based on a movement direction MO and a movement, amount MD of the left hand object 400L. Specifically, the movement direction MO toward which the left hand object 400L has been moved extends along the leftward direction among the deformation directions TD, and thus the target object 500 is enlarged along the leftward direction. An amount of the enlargement is determined based on the movement amount MD, and the target object 500 is enlarged along the leftward direction so that a surface (left-side surface) from which the target object 500 is to be enlarged by the movement amount MD is moved toward the leftward direction. At this time, in at least one embodiment, a surface (right-side surface) opposed to the above-mentioned surface from which the target object 500 is to be enlarged be inhibited from being moved. With this, the positional relationship between the target object 500 and the right hand object 400R can be prevented from becoming unnatural due to the deformation of the target object 500.

In Step S21-1, the control unit 121 deforms the target object 500, and updates the coordinate information on the deformed target object 500. The coordinate information is information for identifying the arrangement position of the target object within the virtual space 200, and is defined based on the space coordinate system xyz in the virtual space 200.

In at least one embodiment, as in FIGS. 22A-22B, the coordinate information on the target object 500 is updated based on the movement direction and the movement amount of the left hand object 400L. In FIG. 22A, assuming that the target object 500 before the deformation has arrangement coordinates O1 (L, 0, 0) defined based on a centroid, the target object 500 has a breadth of 2L. In FIG. 22B, assuming that the movement direction MO of the left hand object 400L is the leftward direction and the movement amount MD is 2D, in at least one embodiment, the movement direction MO of the arrangement coordinates O1 be the leftward direction in the same manner as the movement direction MO of the left hand object 400L and the movement amount of the arrangement coordinates O1 be D. The target object 500 after the deformation has arrangement coordinates O2 (L+D, 0, 0) and a breadth of 2L+2D. In at least one embodiment, the movement amount of the arrangement coordinates O1 is half of the moving distance of the left hand object 400L. With this, even when the target object 500 is deformed, the target object 500 is enlarged without changing the position of the right edge of the target object 500 selected (gripped) by the right hand object 400R, and the arrangement coordinates O2 of the target object 500 after the deformation are easily determined. Therefore, the positional relationship between the target object 500 and the right hand object 400R (first operation object) can be prevented from becoming unnatural due to the deformation of the target object 500.

In Step S22-1, the control unit 121 updates the visual-field image M based on the moved hand object 400 and the deformed target object 500, and outputs the visual-field image M to the HMD 110. With this, the user U can be provided with such a virtual experience as to be able to operate the target object 500 at will.

After that, the processing may return to Step S10-1 to wait for the movement of the hand of the user U again. Further, when the target object 500 continues to be selected by the right hand object 400R, the processing may return to Step S16 to continue to execute processing for receiving the movement of the left hand object 400L and further deforming the target object 500.

Figure 20C:
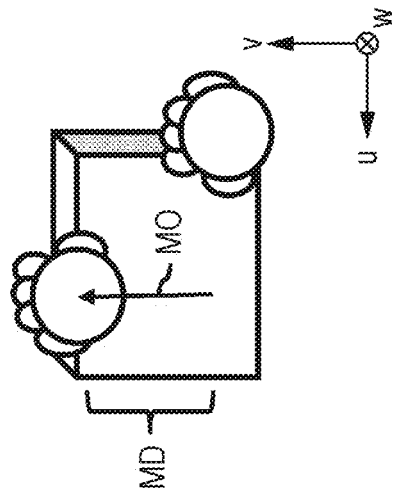
FIGS. 20A-20C Diagrams of how the target object 500 selected by the right hand object 400R is deformed by the left hand object 400L according to at least one embodiment of this disclosure.
Figure 20B:
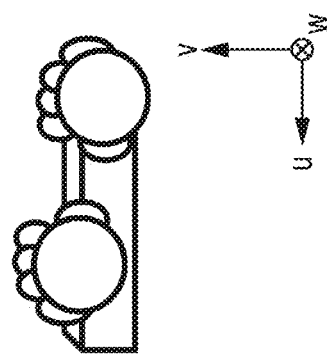
Figure 20A:
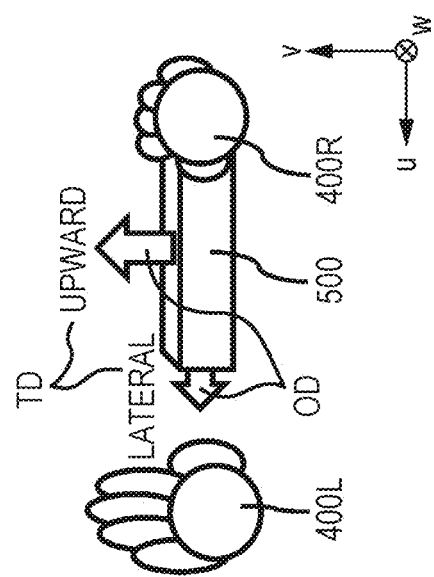

In FIG. 20A, the selection of the target object 500 performed by the left hand object 400L is canceled after the target object 500 has been enlarged toward the leftward direction as described above. This corresponds to FIG. 19A, the target object 500 is further enlarged toward the upward direction being the deformation direction by moving the left, hand object 400L toward the upward direction as in FIG. 20C after selecting the upper surface of the target object by the left hand object 400L as in FIG. 20B. In this manner, the user U can deform the target, object 500 at will based on the hand object 400 by repeating the above-mentioned process.

In at least one embodiment, as in FIG. 21, in at least one embodiment, the deformation direction TD is inhibited from changing even when the direction of the target object 500 is changed through the movement of the right hand object 400R after the deformation direction of the target object 500 is identified by the right hand object 400R. In a case of enlarging the target object 500 toward the depth direction after selecting the target, object 500 by the right hand object 400R, the user U is expected to change the direction of the target object 500 so as to be able to visually recognize the depth direction of the target object 500 in order to finely adjust the length for the enlargement. Even in this case, the user U can enlarge the target object 500 toward the depth direction by the left hand object 400L while visually recognizing the depth direction without changing the deformation directions TD, and can be provided with a consistent operation feeling.

In FIG. 23, the user U repeats the above-mentioned operation to change the target object 500 so as to have a shape suitable to cover the pit of the passage RW, and then arranges the target object 500 in the pit by the hand object 400. With this, the user U can cause the character object CO to reach the goal point, and can clear the game.

Figure 24:
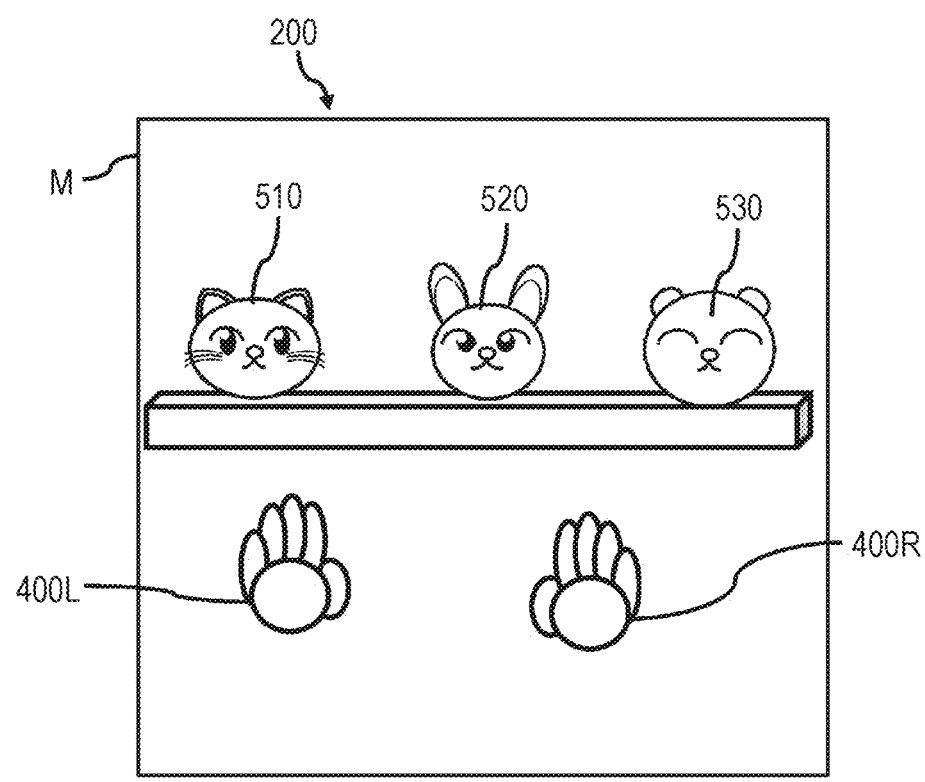
FIG. 24 A diagram of an example of the visual-field image displayed on the HMD according to at least one embodiment of this disclosure.

An information processing method according to at least one embodiment of this disclosure is described with reference to FIG. 24 to FIGS. 32A-32B. FIG. 24 is a diagram of an example of the visual-field image M displayed on the HMD 110 according to at least one embodiment of this disclosure. The virtual space 200 includes target objects 510, 520 and 530. FIG. 25 to FIG. 27 and FIG. 30 are flowcharts of the information processing method according to at least one embodiment of this disclosure. FIG. 28 and FIG. 31 are diagrams of data structures of information stored in the respective HMD systems 1A and 1B and the management server 4 according to at least one embodiment of this disclosure. FIGS. 29A-29B and FIGS. 32A-32B are diagrams of a visual-field image to be displayed when the target objects 510 to 530 are operated by the hand object 400 according to at least one embodiment of this disclosure.

Figure 25:
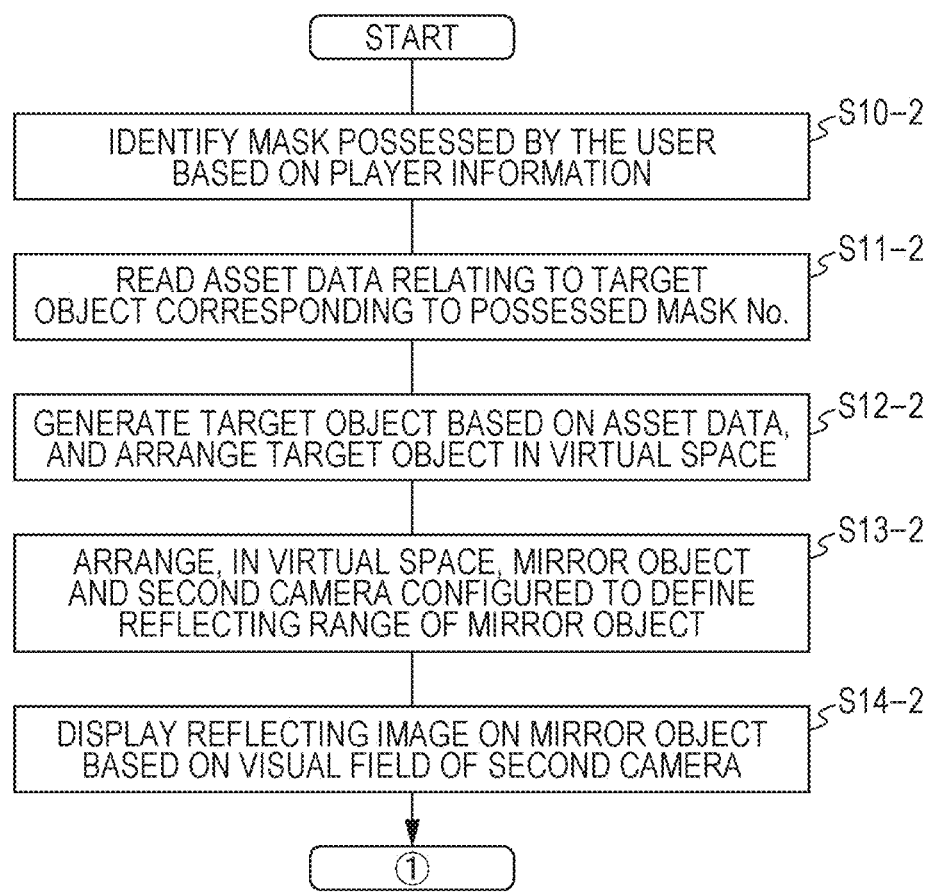
FIG. 25 A flowchart of an information processing method according to at least one embodiment of this disclosure.

In FIG. 25, in Step S10-2, the control unit 121 identifies a mask possessed by the user based on player information stored in the storage unit 123 and the memory. The mask is an example of the target object 500, and the user downloads asset data for defining a desired mask from the management server 4 in advance, and stores the asset data in the storage unit 123 and the memory.

In Step S11-2, the control unit 121 reads asset data relating to a desired mask based on the asset data stored in the storage unit 123 and the memory. When the asset data relating to the desired mask is not stored in the storage unit 123 or the memory, the control unit 121 executes processing for downloading the asset data from the management server 4.

FIG. 28 is a diagram of an example of the data structure of the asset data stored in the asset management unit 42 of the management server 4, the storage unit 123, and the memory. The asset data includes information for defining a plurality of masks, which are respectively associated with different kinds of graphic data. With this, the user can advance the game through use of a player character having a desired outer appearance. Further, the asset data may be defined so as to correct an endurance power, an attacking power, or other such parameter associated with the player character. In addition, each piece of asset data may be associated with a price, and may be defined so as to enable the asset data to be used through payment processing performed by the user.

In Step S12-2, the control unit 121 generates a target object based on the asset data, and arranges the target object in the virtual space. In at least one embodiment, in FIG. 24, the control unit 121 arranges the target object 510 associated with a mask No. 1, the target object 520 associated with a mask No. 2, and the target object 530 associated with a mask No. 3 in the virtual space 200. As described above, only the mask that can be selected through, for example, the payment processing performed by the user may be arranged in the virtual space 200, or the mask selected by the user after all masks are arranged in the virtual space 200 may be set selectable through, for example, the payment processing.

In Step S13-2, the control unit 121 arranges, in the virtual space, a mirror object (an example of a third object) and a second camera configured to define a reflecting range of the mirror object. In at least one embodiment, as in FIGS. 29A-29B, the mirror object 600 is arranged in the virtual space 200. In a case of providing such a virtual experience to be enjoyed from a first-person point of view as described later, in at least one embodiment, the player character PC is inhibited from being displayed in a visual field from the virtual camera (first camera) 300 configured to define the range of the visual-field image to be displayed on the display unit 112 of the HMD 110. Even in this case, in order for the user to check the outer appearance of the player character PC, the control unit 121 arranges the mirror object 600 in the virtual space 200. Another virtual camera (second camera) 310 different from, the first camera 300 is arranged near the mirror object 600 in advance, and an image acquisition unit (part configured to define the visual field) of the second camera 310 is arranged near a display surface of the mirror object 600. The control unit 121 projects an image acquired by the second camera 310 onto the display surface of the mirror object 600 as a laterally reversed image, to thereby be able to cause the mirror object 600 to function as a mirror.

In Step S14-2, the control unit 121 displays a reflecting image on the mirror object 600 based on the visual field of the second camera 310 as described above. When the player character PC is arranged in the visual field of the second, camera 310, the outer appearance of the player character PC is displayed on the mirror object 600 as the reflecting image. When the display surface of the mirror object 600 is arranged within the visual field of the second, camera 310 in the above-mentioned state, the user can visually recognize the outer appearance of the player character PC via the second camera 310 and the mirror object 600.

Figure 26:
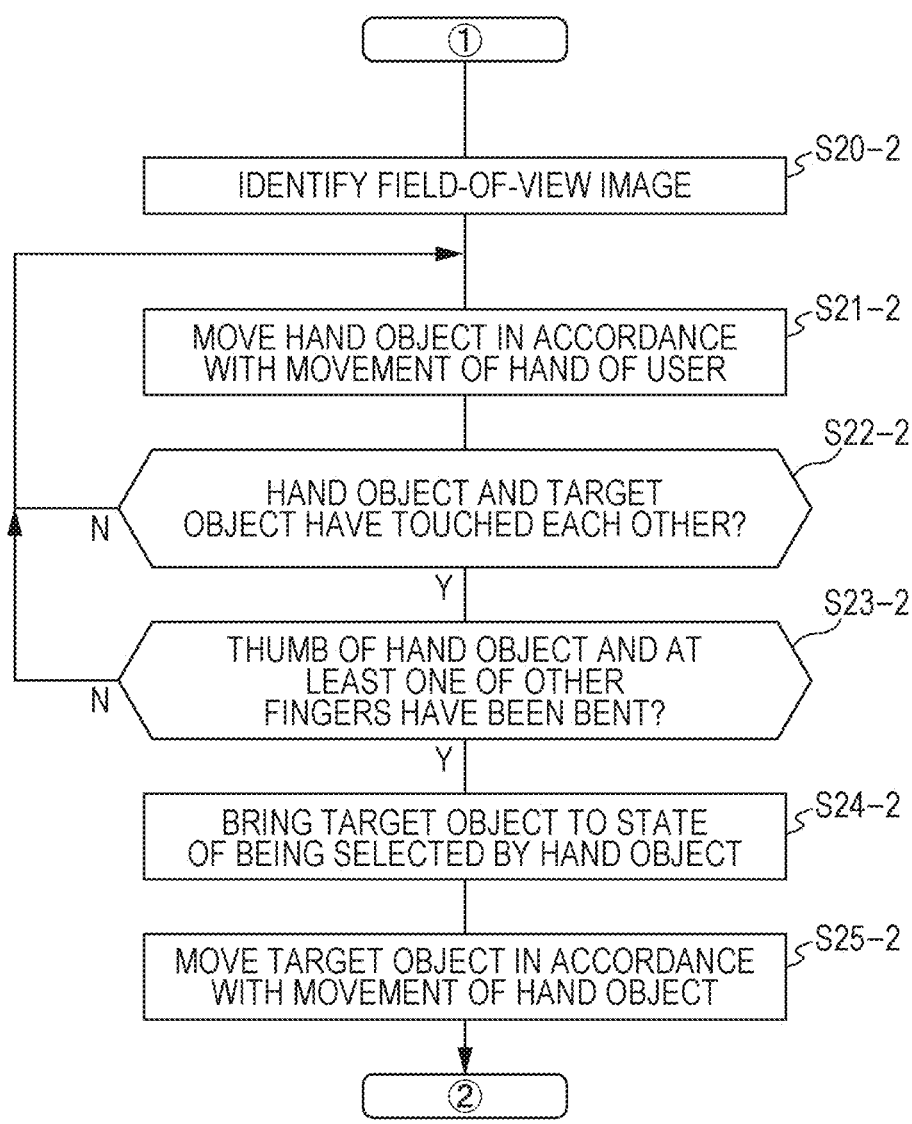
FIG. 26 A flowchart of an information processing method according to at least one embodiment of this disclosure.

Subsequently, in FIG. 26, in Step S20-2, the control unit 121 identifies the visual-field image M to be presented on the HMD 110. In at least one embodiment, as in FIG. 9B, the target object 500 and the hand objects 400L and 400R exist in front of the virtual camera 300. Therefore, as in FIG. 24, the target object 500 (510 to 530) and the hand object 400 are displayed within the visual-field image M.

In at least one embodiment, the virtual camera 300 is arranged inside the player character PC. With this, a point of view viewed from the player character PC is displayed on the display unit 112 of the HMD 110, which allows the user U to enjoy the virtual experience from the first-person point of view. In this case, as in FIG. 24, the visual-field image M from the first-person point of view can be provided by inhibiting the player character PC from being displayed in the visual field of the virtual camera 300. When the virtual camera 300 is arranged behind the player character PC, the visual-field image M from a third-person point of view can be provided. In this case, in at least one embodiment, the player character PC is displayed in the visual field of the virtual camera 300.

In Step S21-2, the control unit 121 moves the hand object 400 as described above in accordance with the movement of the hand of the user U detected by the controller 320.

In Step S22-2, the control unit 121 determines whether or not the target object 500 and the hand object 400 have satisfied a predetermined condition. In at least one embodiment, the control unit 121 determines whether or not each of the hand objects 400 and the target object 500 have touched each other based on the collision area CA set for the left hand object 400L and the right hand object 400R. When each of the hand objects 400 and the target object 500 have touched each other, the processing proceeds to Step S13-2. When each of the hand objects 400 and the target object 500 have not touched each other, the control unit 121 waits for the information on the movement of the hand of the user again, and continues to control the movement of the hand object 400.

In Step S23-2, the control unit 121 determines whether or not a movement for selecting the target object 500 has been input to the hand object 400. In at least one embodiment, the target object 500 is selected by the virtual hand 400 through the gripping action. Specifically, the control unit 121 determines whether or not the movement of the hand object 400 includes a movement for moving the thumb and any one of the opposing fingers (at least one of the index finger to the little finger) from the first position being the stretched state to the second position being the bent state.

In Step S24-2, the control unit 121 brings the target object 500 to the state of being selected by the hand object 400. In at least one embodiment, in response to a determination that the hand object 400 and the target object 500 have touched each other and the respective fingers of the hand object 400 are bent by such an operation as described above, the target object 500 is brought to the state of being selected by being gripped by the hand object 400.

In Step S25-2, the control unit 121 moves the target object 500 in accordance with the movement of the hand object 400 with the target object 500 being selected. With this, the user U can enjoy such a virtual experience as to be able to operate the target object 500 by the virtual hand 400 at will.

In at least one embodiment, as in FIG. 24 and FIGS. 29A-29E, any one of the target objects 500 (masks 510 to 530) is selected by the hand object 400 and is caused to touch the player character PC, to thereby be able to change at least a part of the outer appearance of the player character PC. Specifically, a face part of the player character PC can be changed to any one of the masks 510, 520 or 530 that has been selected. In the following description, the target object corresponding to the outer appearance of the player character PC before being changed is assumed to be the mask 520, and the target object before being changed may be referred to as "first object". Further, the target object corresponding to the outer appearance of the player character PC after being changed is assumed to be the mask 510, and the target object after being changed may be referred to as "second object". Further, the player character PC whose display form of the outer appearance is to be changed may be referred to as "first player character".

Figure 27:
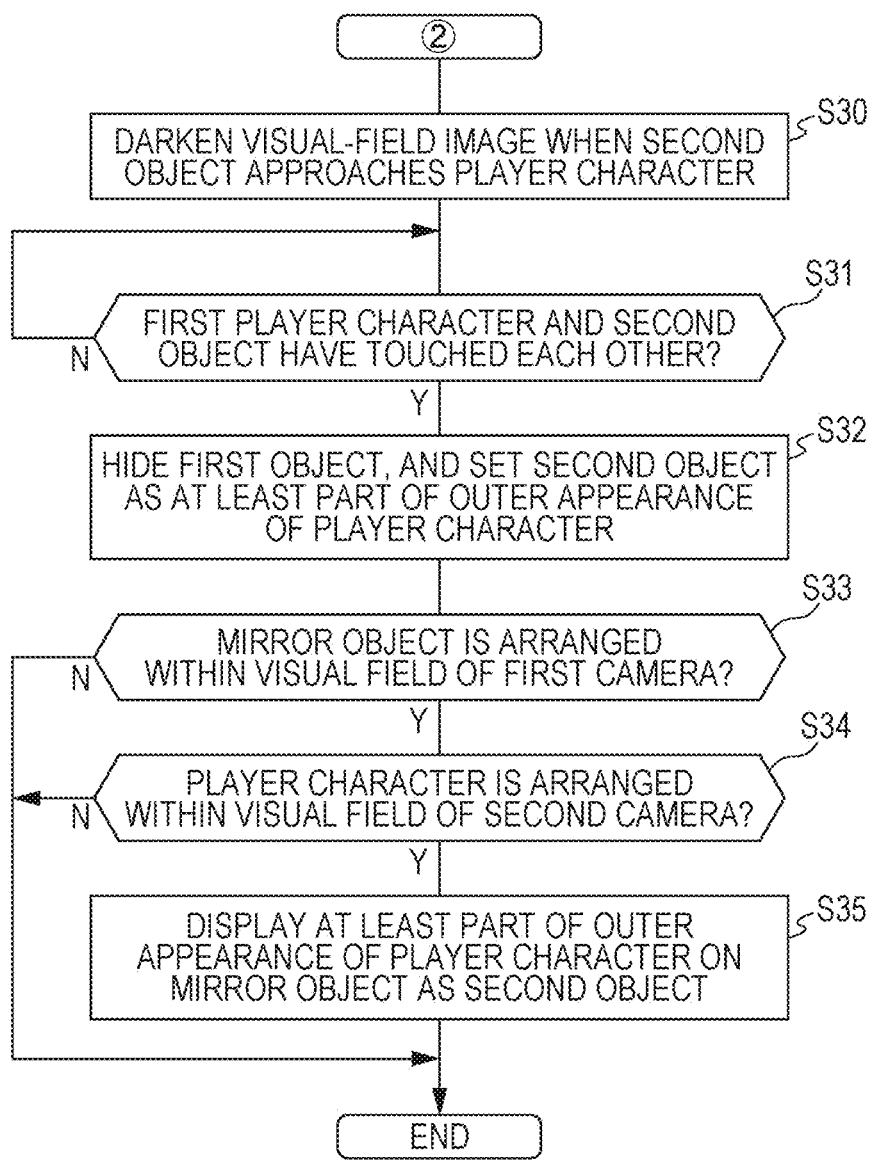
FIG. 27 A flowchart of an information processing method according to at least one embodiment of this disclosure.
Figure 29A:
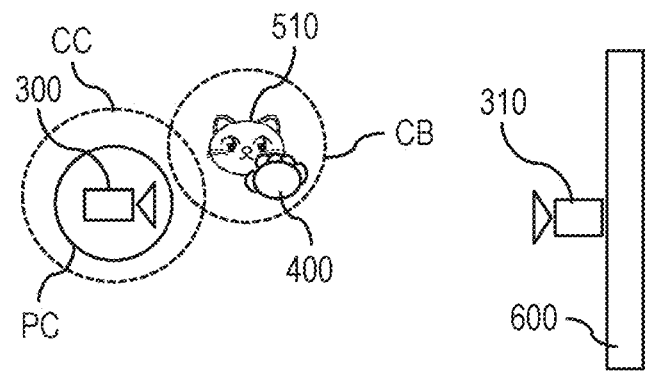
FIGS. 29A-29B Diagrams of an example of a relationship between a positional relationship among the respective objects and the visual-field image according to at least one embodiment of this disclosure.
Figure 29B:
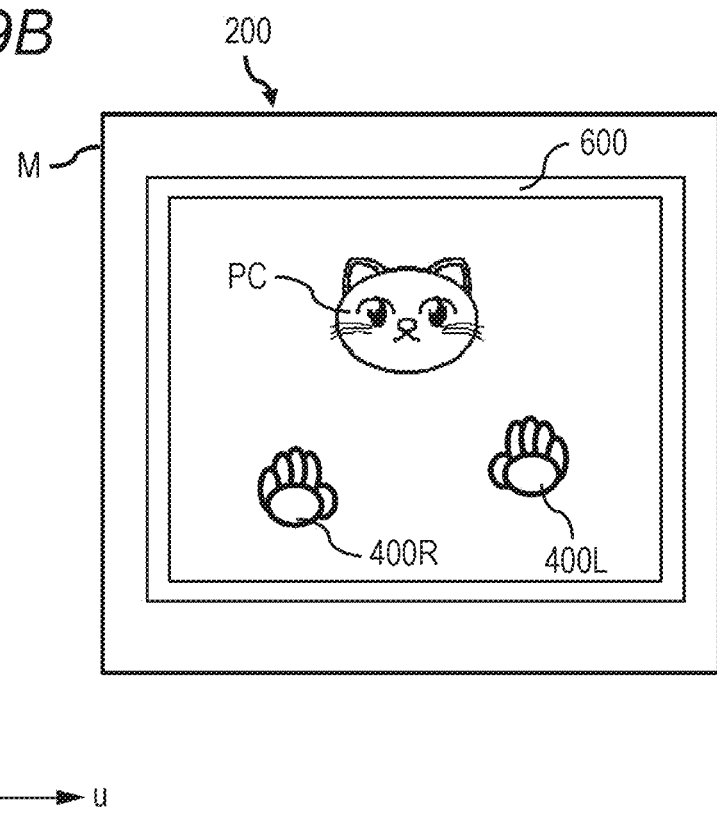

In at least one embodiment, in FIG. 27, in Step S30, the control unit 121 darkens the visual-field image M when the second object 510 approaches the player character PC by the hand object 400. The approaching of the second object 510 to the player character PC may be detected based on a distance between the collision areas CB and CC, or may be detected by further providing another collision area in an outer periphery of each of the collision areas CB and CC.

In Step S30, the control unit 121 can employ various image processing methods for reducing visual effects to be provided to the user based on the visual-field image, for example, a method of lowering a brightness of the visual-field image M, a method of applying a blur thereto, and a method of hiding a predetermined range within the visual field. When the outer appearance of the player character PC is changed in the virtual experience provided from the first-person point of view, preventing the visual-field image from flickering is possible. This is because the visual-field image is covered with images of the front surface and the inside when the second object 510 is moved near the first camera 300, which may provide an unpleasant feeling to the user.

In Step S31, the control unit 121 determines whether or not the first player character PC and the second object 510 have touched each other. The touching between the first player character PC and the second object 510 is preferred to be determined based on the collision areas CB and CC as described above.

In Step S32, the control unit 121 hides the first object 520, and sets the second object 510 as at least apart, of the outer appearance of the player character. With this, the user operates the target object in accordance with the movement of a part of his or her own body in the virtual space 200, to thereby be able to designate the outer appearance of the first player character to be an operation target. With this, providing the user with a new virtual experience is possible.

In Step S33, the control unit 121 determines whether or not the mirror object 600 is arranged within the visual field of the first camera 300. In addition, in Step S34, the control unit 121 determines whether or not the player character PC is arranged within the visual field of the second camera 310. When both the above-mentioned determination steps result in "Yes", in Step S35, the control unit 121 displays at least a part of the outer appearance of the player character PC on the mirror object 600 as the second object 510. With the above-mentioned processing, in FIG. 29B, the visual-field image M including the image of the mirror object 600 reflecting the image of the mask 510 is generated as the outer appearance of the player character PC, and is displayed on the display unit 112 of the HMD 110. With this, in the virtual experience provided from the first-person point of view, the user can check his or her own display form in the virtual space by checking an appearance of the first player character projected on the third object. With this, an intuitive virtual experience can be provided.

Figure 30:
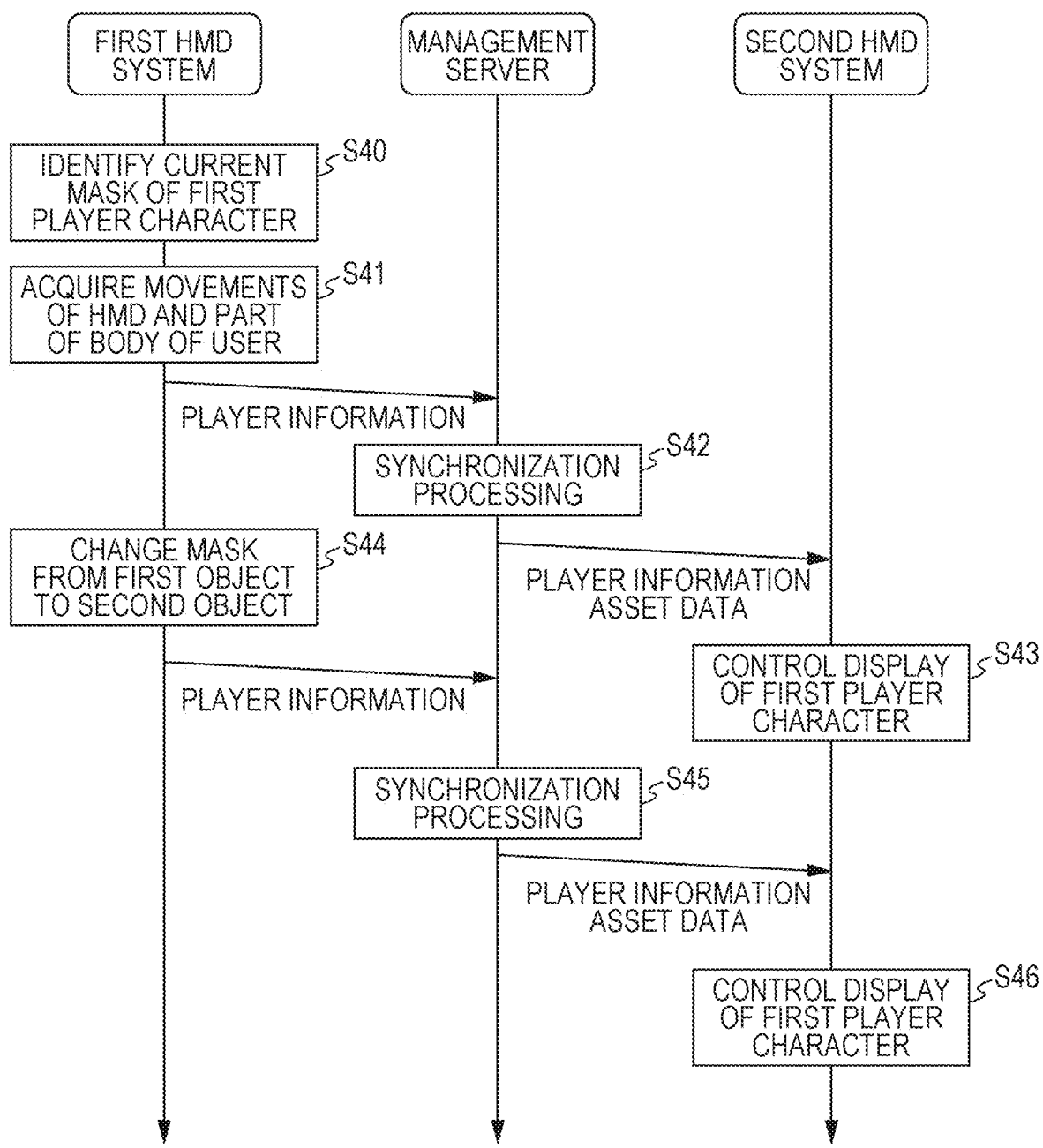
FIG. 30 A flowchart of an information processing method according to at least one embodiment of this disclosure.

Such an information processing method as described above can be applied even in the case of providing a virtual space 200A shared by the plurality of HMD systems 1A and 1B. FIG. 30 is a flowchart of the information processing method for changing, when the outer appearance of a first player character PC1 associated with a first HMD system 1A is changed as described above, the outer appearance of the first player character PC1 in a second HMD system 1B in the virtual space 200A according to at least one embodiment of this disclosure.

In Step S40, the control unit 121 of the first HMD system 1A identifies a current mask being the outer appearance of the first player character PC1 as described above. The first player character PC1 is operated by the operation input performed on the HMD 110 and the controller 320 by the user associated with the first HMD system 1A. Then, in Step S41, the control unit 121 of the first HMD system 1A acquires the movements of the HMD 110 and the part of the body of the user as described above. After that, the control unit 121 operates the first player character PC1, and transmits information relating to the movements to the management server 4 as the player information.

In Step S42, the control unit 41 of the management server 4 stores the player information received from the first HMD system 1A in the player management unit 43. FIG. 31 is a diagram of an example of the data structure of the player information according to at least one embodiment of this disclosure. In at least one embodiment, the player information includes information relating to a position of the camera, a direction of the camera, a position of the hand, a direction of the hand, a state of the hand, and a mask No., which are associated with a user ID. The position of the camera and the direction of the camera are identified based on the position and the direction of the HMD 110 in the first HMD system 1A. In the same manner, the position of the hand, the direction of the hand, and the state of the hand are identified based on the position and the direction of the controller 320 in the first HMD system 1A. The respective positions and the respective directions may be identified based on the coordinates and the directions in the virtual space 200A. The mask No. is information for identifying the target object currently associated with the first player character PC1.

The player information may be associated with information (including a room ID) for identifying the virtual space 200A configured to be shared by a plurality of users that are matched with each other. Those pieces of player information are integrated for each user, and are transmitted to all the users associated with the virtual space 200A, to thereby cause synchronization processing to be executed. When the asset data associated with the mask No. is not stored in a predetermined HMD system, the asset data may be transmitted along with the integrated pieces of player information.

Figure 32A:
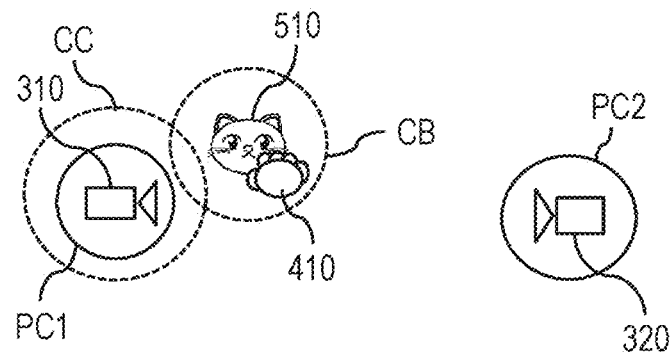
FIGS. 32A-32B Diagrams of an example of a relationship between the positional relationship among the respective objects and the visual-field image according to at least one embodiment of this disclosure.
Figure 32B:
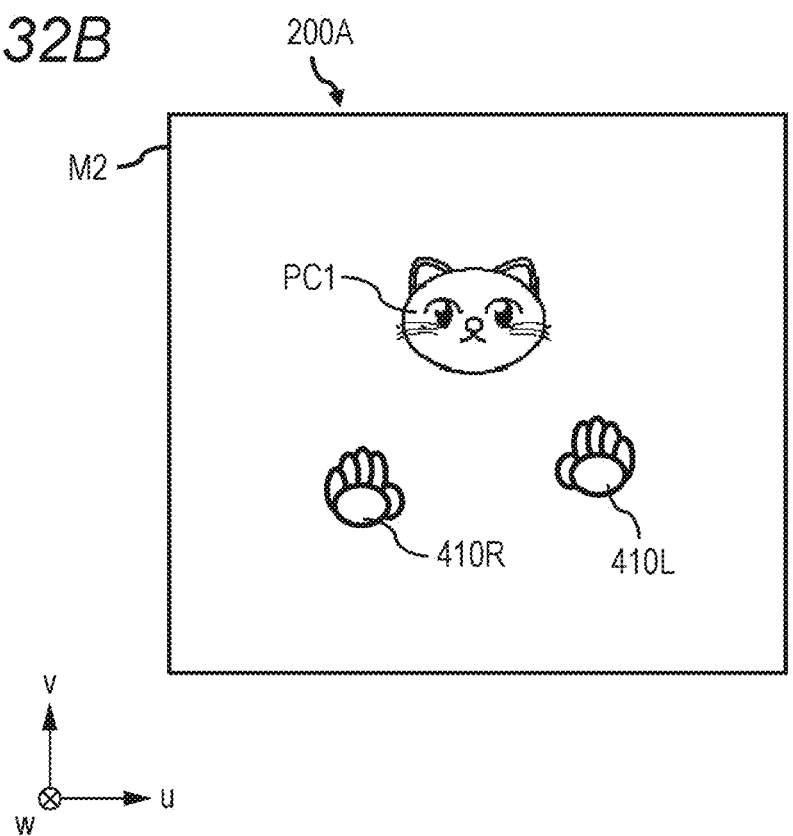

In Step S43, the control unit 121 of the second HMD system 1B controls the display form of the first player character PC1 based on the received player information. In FIG. 32A, the first player character PC1 is included in the visual field of the virtual camera 320 (an example of the second camera) in the second HMD system 1B, and thus the first player character PC1 is operated based on the player information transmitted from the first HMD system 1A. Specifically, FIG. 32B is a diagram, of an example of a visual-field image M2 presented to the second HMD system 1B by the virtual camera 320 according to at least one embodiment of this disclosure. The control unit 121 of the second HMD system 1B controls the position and the direction of the first player character PC1 based on the player information relating to the position of the camera and the direction of the camera, respectively. Further, the control unit 121 of the second HMD system 1B controls the positions, the directions, and the states of the respective fingers of the right hand object 400R and the left hand object 400L based on the player information relating to the position of the hand, the direction of the hand, and the state of the hand.

In Step S44, when the current mask being the outer appearance of the first, player character PC1 is changed from the first, object (mask 520) to the second object, (mask 510) as described above, the control unit 121 of the first HMD system 1A transmits information including the mask No. for identifying the mask after the change to the management, server 4 as the player information.

In Step S45, the control unit 41 of the management server 4 updates the player information as described above, and transmits the player information indicating that, the mask has been updated to the second HMD system 1B, to thereby execute the synchronization processing. When the second HMD system 1B does not store the asset data on the mask after the change in the storage unit, the control unit 41 transmits the asset data on the mask along with the player information.

In Step S46, the control unit 121 of the second HMD system 1B controls the display form of the first player character PC1 based on the received player information. The control unit 121 of the second HMD system 1B hides the first object 520 that has been displayed as the first player character PC1, and displays the second object 510 as the first player character PC1 as in FIG. 32B. With this, when another user designates the outer appearance of the first player character by operating the target object in the virtual space, the first player character whose outer appearance has been changed can easily be displayed in the visual field of a second head-mounted device. With this, providing the user with a new virtual experience is possible.

An information processing method according to at least one embodiment of this disclosure is described with reference to FIG. 33 to FIGS. 37A-37B. FIG. 33 to FIGS. 37A-37B are diagrams of examples of a positional relationship between the hand object 400 and each of the target objects 500 (masks 510 to 530) and the visual-field image including those objects according to at least one embodiment of this disclosure. In particular, FIG. 33 to FIGS. 37A-37B are diagrams of a case in which the target object 500 is operated by the hand object 400 according to at least one embodiment of this disclosure.

Figure 33:
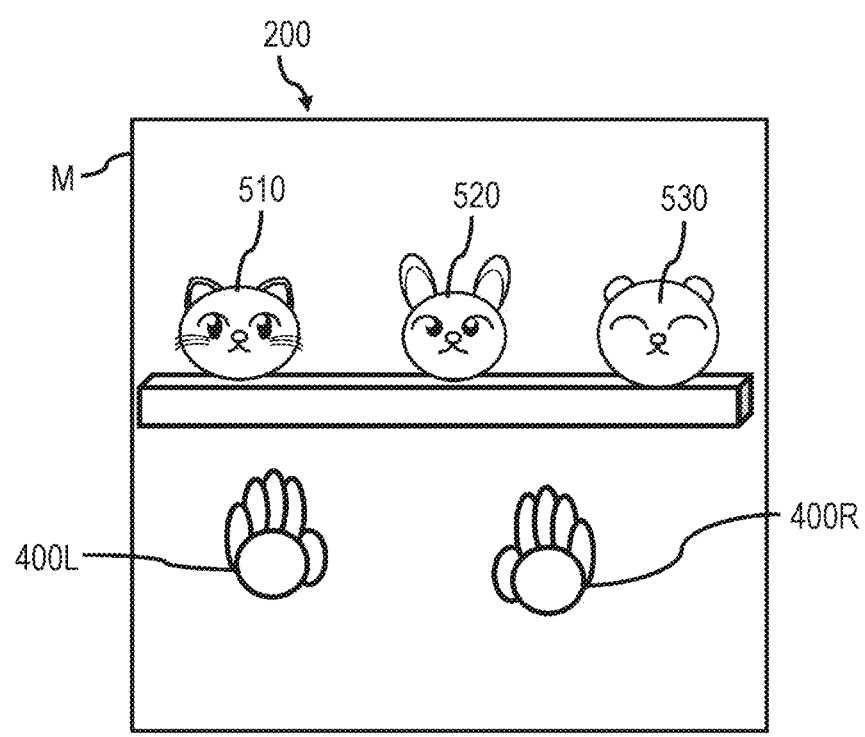
FIG. 33 A diagram of an example of the visual-field image displayed on the HMD according to at least one embodiment of this disclosure.

In FIG. 33, the plurality of target objects 500 (masks 510 to 530) are displayed in the visual-field image M. The control unit 121 identifies a mask possessed by the user based on the player information stored in the storage unit 123 and the memory. The mask is an example of the target object 500, and the user downloads the asset data for defining a desired mask from the management server 4 in advance, and stores the asset data in the storage unit 123 and the memory.

The control unit 121 generates the target object 500 based on the asset data, and arranges the target object 500 in the virtual space 200. In at least one embodiment, in FIG. 33, the control unit 121 arranges the masks 510 to 530 in the virtual space 200.

The control unit 121 identifies the visual-field image M to be presented on the HMD 110. In at least one embodiment, in FIG. 9B, the target object 500 and the hand objects 400L and 400R exist in front of the virtual camera 300. Therefore, in FIG. 33, the target object 500 (510 to 530) and the hand object 400 are displayed within the visual-field image M. Further, a state in which the user U has moved from the above-mentioned state to reach such a position as to view the masks 510 to 530 arranged in a line diagonally from one side is illustrated in FIG. 34.

Figure 34A:
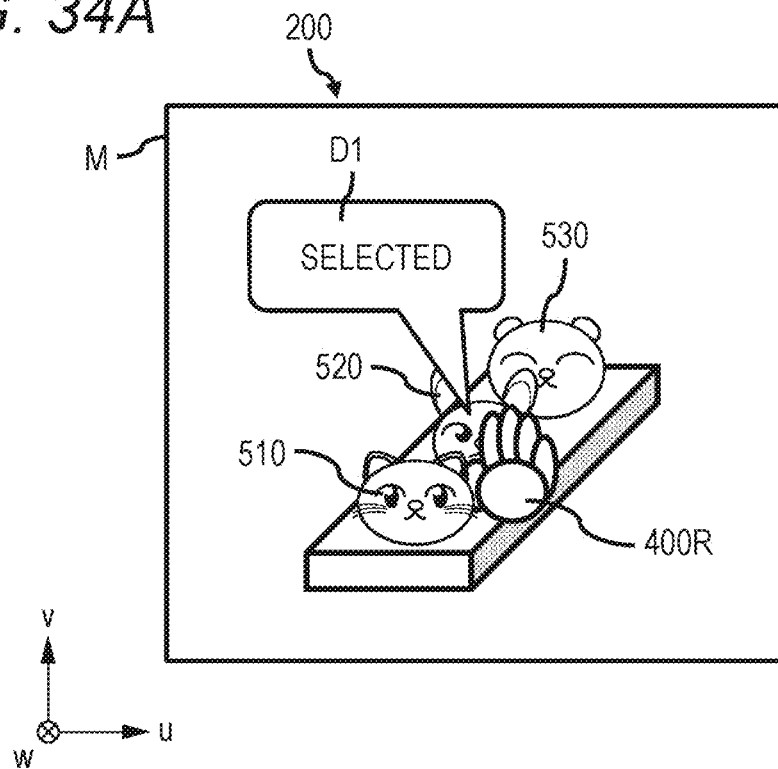
FIGS. 34A-34B Diagrams of an example of a relationship between the positional relationship among the respective objects and the visual-field image according to at least one embodiment of this disclosure.

In FIG. 34A, when the masks 510 to 530 are arranged in the depth direction (roll direction: W direction) within the visual-field image M, it is difficult for the user to select a desired target object 500 by the hand object 400. This is because the user has difficulty intuitively recognizing at which position in the depth direction the hand object 400 is arranged when viewed from the user.

In at least one embodiment, the display form, of an object that satisfies a selection condition for being selected based on the hand object 400 is changed. For example, in FIG. 34A, the mask 520 is identified as the target object 500 to be selected by the right hand object 400R. In this case, the control unit 121 changes the display form of the mask 520 so as to add a distinctive indication D1 to the mask 520. The distinctive indication D1 includes the character string "selected", and lets the user know that the mask 520 is a selection target being selected by the right hand object 400R. The other adjacent masks 510 and 530 may be inhibited from becoming more conspicuous than the mask 520 by being displayed in a less highlighted manner as the display form, without a change being performed, on the display form of the mask 520. The displaying in a less highlighted manner includes, for example, darkening a color tone or lowering a resolution. At this time, the masks 510 and 530 may be inhibited from being selected by the right hand object 400R so as to prevent the other masks 510 and 530 from being erroneously selected by the right hand object 400R.

Figure 35A:
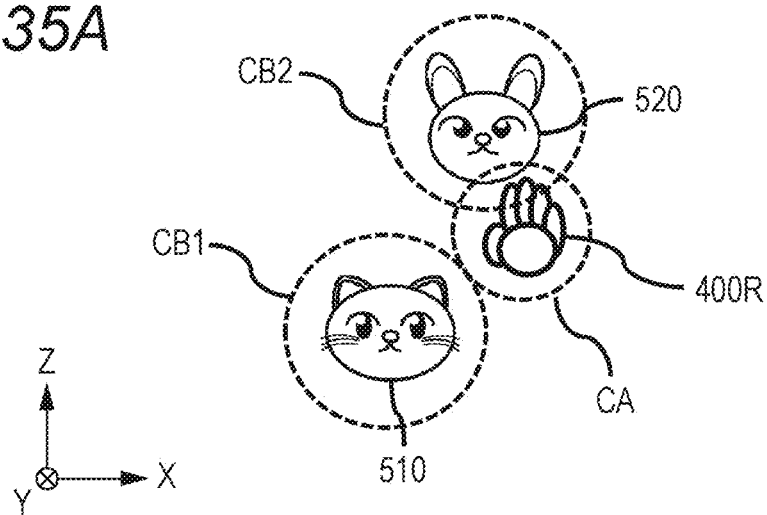
FIGS. 35A-35B Diagrams of an example of a relationship between the positional relationship among the respective objects and the visual-field image according to at least one embodiment of this disclosure.
Figure 35B:
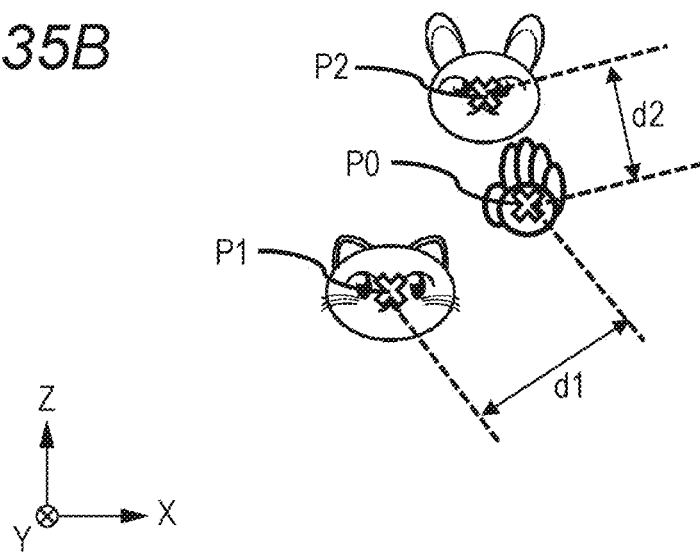

FIGS. 35A-35B is a diagram of an example of a method of identifying the target object 500 to be selected by the right hand object 400R according to at least one embodiment of this disclosure. In FIG. 35A, the collision area CA having a spherical shape is set for the right hand object 400R, a collision area CB1 having a spherical shape is set for the mask 510, and a collision area CB2 having a spherical shape is set for the mask 520. In this case, the mask 520 is set as the selected object based on the selection condition that an overlapping area between the collision area CA for the right hand object 400R and collision area CB2 is the largest among the overlapping areas, e.g., in comparison with overlap with collision area CB1. In FIG. 35A, the control unit 121 has the collision area CA for the right hand object 400R partially overlapping the collision areas CB1 and CB2 of the mask 510 and the mask 520, respectively. The control unit 121 compares an overlapping area between the collision area CA and the collision area CB1 with an overlapping area between the collision area CA and the collision area CB2, and identifies the target object 500 having a larger overlapping area as the selection target. In at least one embodiment, the mask 520 having a larger overlapping area is set as the selection target.

In FIG. 35B, the control unit 121 may identify the target object 500 arranged at a position closest to the coordinates of the right hand object 400R as the selection target. In FIG. 35B, a distance d2 between point P0 of the right hand object and point P2 of the mask 520 is smaller than a distance d1 between point P0 of the right hand object and point P1 of the mask 510, and thus the mask 520 is set as the selection target.

Figure 34B:
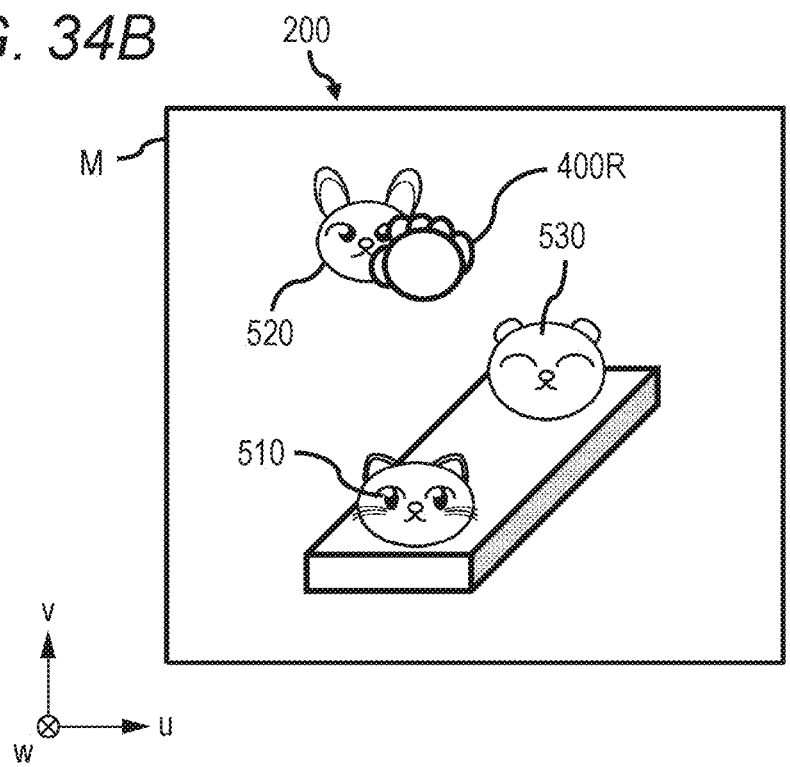

When the fingers of the right hand object 400R are bent under the above-mentioned state, as in FIG. 34B, the control unit 121 causes the right hand object 400R to grip the mask 520. Specifically, the control unit 121 determines whether or not the movement of the hand object 400 includes a movement for moving the thumb and any one of the opposing fingers (at least one of the index finger to the little finger) from the first position being the stretched state to the second position being the bent state.

The control unit 121 brings the target object 500 to the state of being selected by the hand object 400. In at least one embodiment, in response to a determination that the hand object 400 and the target object 500 have touched each other and the respective fingers of the hand object 400 are bent by such an operation as described above, the target object 500 is brought to the state of being selected by being gripped by the hand object 400.

The control unit 121 moves the target object 500 in accordance with the movement, of the hand object 400 with the target object 500 being selected. With this, the user U can enjoy such a virtual experience as to be able to operate the target object 500 by the virtual hand 400 at will.

Figure 36A:
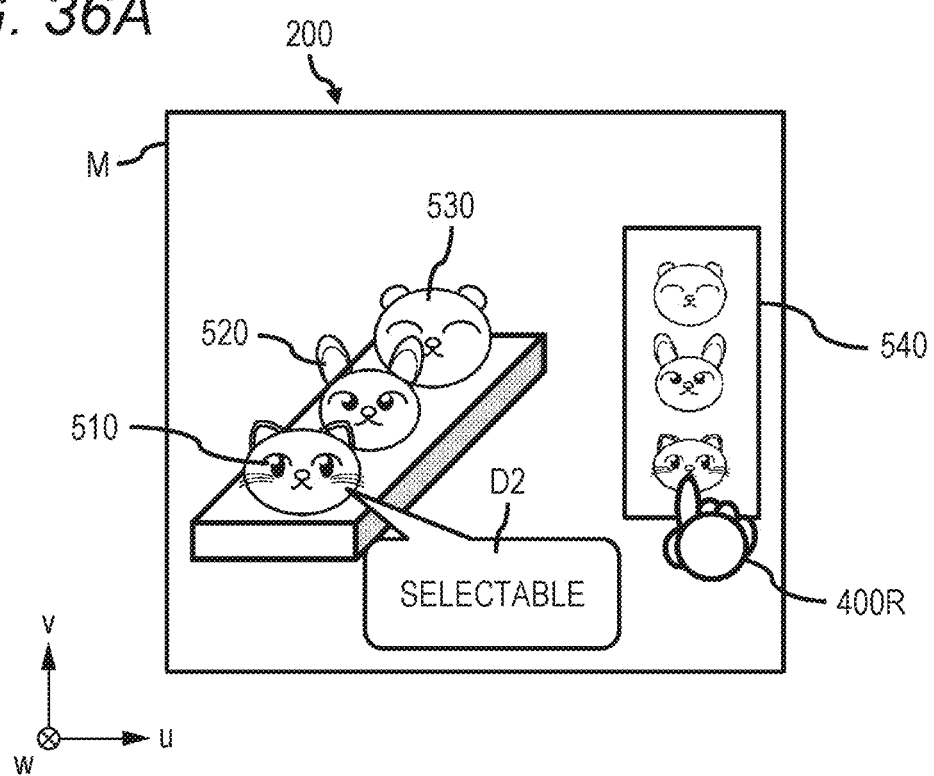
FIGS. 36A-36B Diagrams of an example of a relationship between the positional relationship among the respective objects and the visual-field image according to at least one embodiment of this disclosure.
Figure 36B:
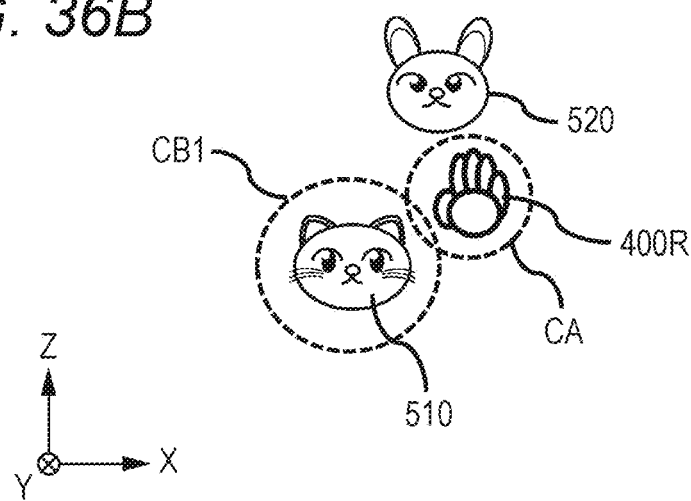

FIGS. 36A-36B are diagrams of a virtual space in which the control unit 121 identifies the selection target of the operation object (hand object 400) according to at least one embodiment of this disclosure. In FIGS. 36A-36B a UI image 540 is displayed within the visual-field image M.

In the UI image 540, images corresponding to the masks 510 to 530 are displayed. In FIG. 36A, the control unit 121 may set the mask 510 as the selection target by having the UI image 540 operated by the hand object 400 in advance. In this case, a distinctive indication D2 including the character string "selectable" for letting the user know that the mask 510 is the selection target is displayed so as to be added to the mask 510. With this, the display form of the mask 510 set as the selection target is changed.

In this case, in FIG. 36B, the control unit 121 may cancel the collision area CB2 set for the other mask 520. With this, preventing a situation that the other mask 520 that is not set as the selection target may be erroneously operated by the hand object 400, and to provide the user with an intuitive virtual experience is possible.

Figure 37A:
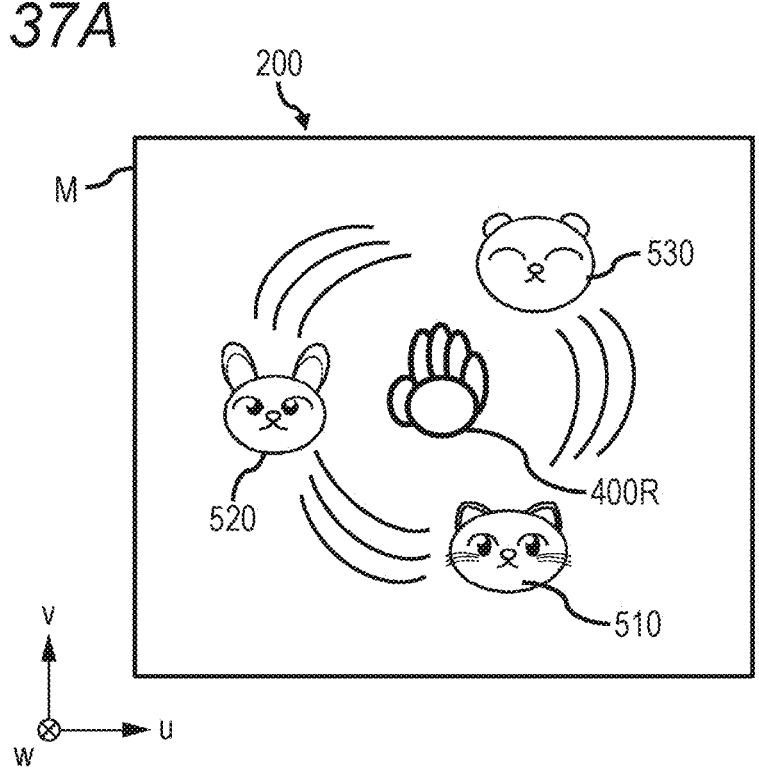
FIGS. 37A-37B Diagrams of an example of a relationship between the positional relationship among the respective objects and the visual-field image according to at least one embodiment of this disclosure.
Figure 37B:
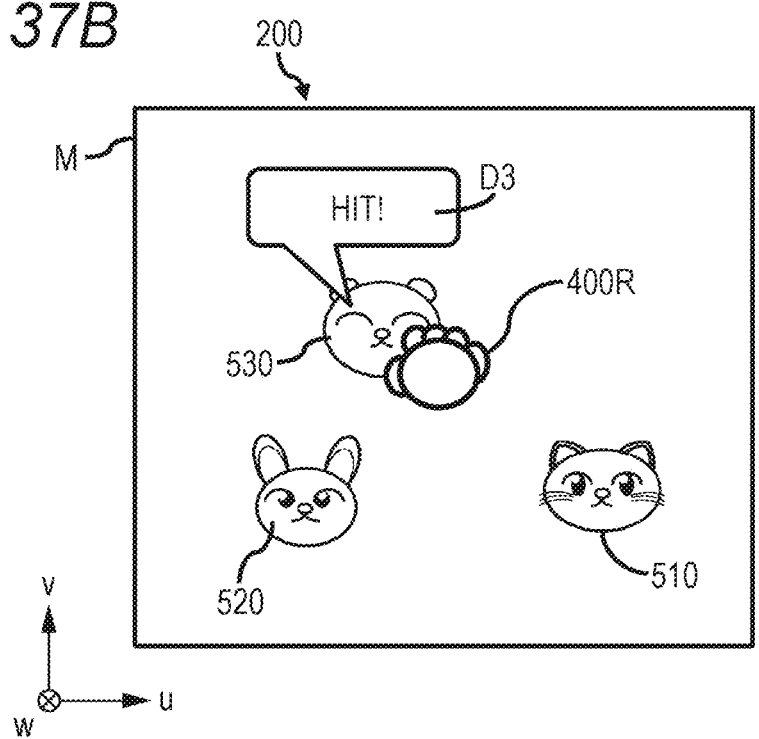

FIGS. 37A-37B are diagrams of a virtual space in which the control unit 121 identifies the selection target of the operation object (hand object 400) according to at least one embodiment of this disclosure. In FIGS. 37A-37B, any one of the masks 510, 520 or 530 among the target objects 500 is selected at random by the hand object 400.

The control unit 121 determines whether or not the plurality of target objects 500 exists within a predetermined range around the hand object 400. In FIG. 37A, the plurality of masks 510, 520 and 530 exists within the predetermined range around the hand object 400, and hence the control unit 121 controls the plurality of masks 510 to 530 so as to rotate around the hand object 400, to thereby render a random selection event.

After that, in FIG. 37B, an operation for having a grip is input to the right hand object 400R, the control unit 121 identifies any one of the masks 510 to 530 at random as the selection target. In FIG. 37B, the mask 530 is selected as the selection target. In addition, the control unit 121 causes the mask 530 to be gripped by the right hand object 400R, and displays, on the mask 530, a distinctive indication D3 including the character string "HIT!" for causing the user to recognize that the mask 530 has been identified as the selection target.

With this, the user can select any one of the plurality of target objects 500 at random through an action of moving his or her own hand. For example, when an event (so-called "lottery") for offering any one of the masks 510 to 530 at random is provided in response to payment made by the user, providing the user with a new virtual experience is possible.

The above description of the embodiments is not to be read as a restrictive interpretation of the technical scope of this disclosure. The above described embodiments are merely given as an example, and it is to be understood by a person skilled in the art that various modifications can be made to the embodiments within the scope of this disclosure set forth in the appended claims. Thus, the technical scope of this disclosure is to be defined based on the scope of this disclosure set forth in the appended claims and an equivalent scope thereof.

In some embodiments, the movement of the hand object is controlled based on the movement of the external controller 320 representing the movement of the hand of the user U, but the movement of the hand object in the virtual space may be controlled based on the movement amount of the hand of the user U. For example, instead of using the external controller, a glove-type device or a ring-type device to be worn on the hand or fingers of the user may be used. With this, the position sensor 130 can detect the position and the movement amount of the hand of the user U, and can detect the movement and the state of the hand and fingers of the user U. Further, the position sensor 130 may be a camera configured to take an image of the hand (including the fingers) of the user U. In this case, by taking an image of the hand of the user with use of a camera, the position and the movement amount of the hand of the user U can be detected, and the movement and the state of the hand and fingers of the user U can be detected based on data of the image in which the hand of the user is displayed, without requiring the user to wear any kind of device directly on his or her hand or fingers.

Further, in some embodiments, there is set a collision effect for defining the effect to be exerted on the target object by the hand object based on the position and/or movement of the hand, which is a part of the body of the user U other than the head, but the embodiments are not limited thereto. For example, there may be set a collision effect for defining, based on a position and/or movement of a foot of the user U being a part of the body of the user U other than the head, an effect to be exerted on a target object by a foot object (example of operation object), which is synchronized with the movement of the foot of the user U.

Further, at least one embodiment has been described by taking the virtual space (VR space) in which the user is immersed by the HMD 110 as an example, but a see-through HMD may be employed as the HMD 110. In this case, the image of the target object 500 may be output via the see-through HMD 110 so as to be mixed, with the real space being visually recognized by the user U, to thereby provide a virtual experience based on an AR space or an MR space. Then, the target object 500 may be selected and operated based on the movement of a first part and a second part (both hands of the user U) of the body of the user in place of the first operation object and the second the operation object. In this case, the coordinate information on the real space and the first part and the second part of the body of the user is identified, and the coordinate information on the target object 500 is defined based on a relationship with the coordinate information in the real space, to thereby be able to exert an action on the target object 500 based on the movement of the body of the user U.

Further, in at least one embodiment, the player information on the HMD 110 and the controller 320 in the second HMD system 1B is transmitted to the first HMD system 1A, to thereby be able to control the display form, of a second, player character PC2 operated by the user associated with the second HMD system 1B on the display of the first HMD system 1A in the same manner. The synchronization processing in at least one embodiment is executed among a plurality of HMD systems, to thereby be able to provide a virtual space shared by a plurality of users.

[Supplementary Note 1]
(Item 1)

An information processing method for controlling a head-mounted device is performed by a processor. The method includes identifying virtual space data for defining a virtual space that includes a virtual camera; an operation object; and a target object. The method further includes acquiring a detection result from a detection unit configured to detect a position of the head-mounted device and a position of a part of a body other than a head of a user. The method further includes moving the virtual camera in accordance with a movement of the head-mounted device. The method further includes moving the operation object in accordance with a movement of the part of the body. The method further includes selecting the target object in accordance with a movement of the operation object. The method further includes moving the target object in accordance with the movement of the operation object with the target object being selected. The method further includes defining a visual field of the virtual camera based on a movement of the virtual camera, and generating visual field image data based on the visual field and the virtual space data. The method further includes displaying a visual-field image on the head-mounted device based on the visual field image data. A direction of the target object is corrected based on a positional relationship between the operation object and the target object, and the target object, the direction of which has been corrected, is associated with the operation object, to thereby select the target object.

According to the method of this item, the posture of the target object is automatically adjusted when the operation object selects the target object. With this, when selecting the target object by moving a part of the body, the user can select the target object without feeling strange even when the positional relationship is not accurately adjusted. Therefore, the interaction between the user and the virtual object can be improved, and thus the virtual experience to be provided to the user can be improved.

(Item 2)

A method according to Item 1, further including identifying a first direction for selecting the target object by the operation object, the first direction being associated with the operation object. The method further includes identifying a second direction for allowing the target object to be selected by the operation object. The method further includes correcting the direction of the target object so as to bring the second direction close to the first direction.

With this, when selecting the target object by moving a part of the body, the user can select the target object without feeling strange even when the positional relationship is not accurately adjusted.

(Item 3)

A method according to Item 2, in which the part of the body is a hand of the user. The operation object is a virtual hand configured to move in accordance with a movement of the hand. The method further includes identifying a plurality of selected parts of the target object for being selected by a plurality of selecting parts of the virtual hand. The method further includes identifying the second direction based on a positional relationship among the plurality of selected parts.

With this, when selecting the target object by moving a part, of the body, the user can select the target object through a gripping action without feeling strange even when the positional relationship is not accurately adjusted.

(Item 4)

A method according to Item 3, further including associating the target object with the operation object while moving the target object toward the operation object, so as to bring the plurality of selected parts close to the plurality of selecting parts.

With this, when selecting the target object by moving a part, of the body, the user can select the target object through the gripping action without feeling strange even when the positional relationship) is not accurately adjusted.

(Item 5)

A method according to Item 3 or 4, further including correcting the direction of the target object when the movement, of the operation object includes a movement for moving the plurality of selecting parts from a first position toward a second position.

With this, the user adjusts the direction of the target object based on an operation input to the virtual hand to select the target object, to thereby be able to select the target object more intuitively.

(Item 6)

A method according to any one of Items 1 to 5, in which the part of the body is a hand of the user. The operation object is a virtual hand configured to move in accordance with a movement of the hand. The method further includes correcting, when a movement of the virtual hand includes a movement for selecting the target object, a position of the target object so as to bring the target object close to the virtual hand.

With this, the user adjusts the position of the target object based on an operation input to the virtual hand to select the target object, to thereby be able to select the target object more intuitively.

(Item 7)

A method according to Item 6, further including setting a collision area for the virtual hand. The method further includes determining whether or not the virtual hand and the target object have touched each other based on the collision area. The method further includes correcting, when the movement of the virtual hand includes the movement for selecting the target object under a state in which the virtual hand and the target object have touched each other, the position of the target object so as to bring the target object close to the virtual hand. The method further includes changing a size of the collision area depending on a speed of the hand of the user.

With this, the target object can be made easier to select depending on the speed of the hand of the user, to thereby allow the user to select the target object more intuitively.

(Item 8)

A method according to any one of Items 1 to 7, further including identifying, when the target object is arranged outside a movable range of the operation object, a first direction for selecting the target object by the operation object, the first direction being associated with the operation object. The positional relationship includes such a relationship that the target object is arranged in the first direction. The method further includes moving the target object toward the operation object along the first direction based on predetermined operation input performed by the user.

With this, the target object arranged out of reach of the virtual hand can be selected easily and intuitively.

(Item 9)

A system for executing the method of any one of Items 1 to 8.

[Supplementary Note 2]

(Item 10)

An information processing method to be executed in a system including a head-mounted display and a position sensor configured to detect a position of the head-mounted display and positions of a first part and a second part of a body other than a head of a user. The information processing method includes identifying virtual space data for defining a virtual space that includes a virtual camera; a first operation object; a second operation object; and a target object. The method further includes moving the virtual camera in accordance with a movement of the head-mounted display. The method further includes moving the first operation object in accordance with a movement of the first part. The method further includes moving the second operation object in accordance with a movement of the second part. The method further includes selecting the target object in accordance with a movement of the first part. The method further includes deforming the target object in accordance with a movement, of the second operation object with the target object being selected. The method further includes defining a visual field of the virtual camera based on a movement of the virtual camera, and generating visual field image data based on the visual field and the virtual space data. The method further includes displaying a visual-field image on the head-mounted display based on the visual field image data.

According to the information processing method of this item, selecting the target object by moving the first operation object and deform the target object by moving the second operation object is possible. Thus, providing a virtual experience that the user can operate the target object at will is possible.

(Item 11)

A method according to Item 10, further including selecting the target object when the first operation object and the target object touch each other. The method further includes deforming the target object based on in a direction in which the second operation object is moved after the second operation object and the target object touch each other.

With this, the target object can be easily deformed based on the movement of the second operation object, and thus providing a virtual experience that the user can operate the target object at will is possible.

(Item 12)

A method according to Item 11, the target object includes coordinate information in the virtual space. The method further includes updating the coordinate information on the target object, based on the direction in which the second operation object is moved.

With this, the positional relationship between the target object and the first operation object can be prevented from becoming unnatural due to the deformation of the target object.

(Item 13)

A method according to Item 12, further including changing, when the second operation object, is moved in a predetermined direction by a predetermined distance, the coordinate information so as to move in the predetermined direction by a half of the predetermined distance.

With this, the positional relationship between the target object and the first operation object can be prevented from becoming unnatural due to the deformation of the target object.

(Item 14)

A method according to any one of Items 10 to 13, further including displaying, when the target object is selected, a direction indication for indicating a deformation direction in which the target object is allowed to be deformed in accordance with the movement of the second operation object, in association with the target object.

With this, a deformation rule for the target object can be clearly presented to the user.

(Item 15)

A method according to Item 14, further including erasing the direction indication when the movement of the second operation object is detected.

With this, a time period for displaying the direction indication can be reduced, and it is possible to prevent the direction indication from interfering with the virtual experience of the user.

(Item 16)

A method according to any one of Items 10 to 15, in which the virtual camera is configured to define a visual-field coordinate system to be moved in accordance with the movement of the head-mounted display, the visual-field coordinate system including a vertical direction, a horizontal direction, and a depth direction. The method further includes identifying at least one of directions of the target object, which are not selected by the first operation object among an upward direction and/or a downward direction, the depth direction and/or a frontward direction, and the horizontal direction of the target object at a time when the target object is selected, as a deformation direction capable of deforming the target object in accordance with the movement of the second operation object.

With this, the deformation direction of the target object can be limited to a dimension that facilitates the operation by the user, and reducing a processing load on a computer without impairing the virtual experience of the user is possible.

(Item 17)

A method according to Item 16, further including inhibiting the deformation direction capable of deforming the target object in accordance with the movement of the second operation object from being changed even when the direction of the target object is changed when the first operation object is moved after the deformation direction is identified.

With this, the deformation direction is not changed even when the user changes the direction of the target object so as to be able to visually recognize a predetermined deformation direction in order to deform the target object in the predetermined deformation direction, to thereby be able to provide the user with a consistent operation feeling.

(Item 18)

A system for executing the method of any one of Items 10 to 19.

[Supplementary Note 3]

(Item 19)

An Information processing method for controlling a first head-mounted device being performed by a processor includes identifying virtual space data for defining a virtual space that includes a virtual camera; a first, player character; an operation object; a first object; and a second object. The method further includes acquiring a detection result, from a detection unit configured to detect a position of the first head-mounted device and a position of a part of a body other than a head of a user. The method further includes moving the virtual camera in accordance with a movement of the first head-mounted device. The method further includes moving the operation object in accordance with a movement of the part of the body. The method further includes selecting the target object in accordance with a movement of the operation object. The method further includes moving the second object in accordance with the movement of the operation object with the second object being selected. The method further includes defining a visual field of the virtual camera based on a movement of the virtual camera, and generating visual field image data based on the visual field and the virtual space data. The method further includes displaying a visual-field image on the first head-mounted device based on the visual field image data. The method further includes changing at least a part of an outer appearance of the first player character from the first object to the second object when a collision between the first player character and the second object is determined based on a movement of the second object performed with the first object being selected as the at least a part of the outer appearance of the first player character.

According to the method of this item, the user operates the second object in the virtual space in accordance with a movement of a part of his or her own body, to thereby be able to designate the outer appearance of the first player character to be an operation target. With this, providing the user with a new virtual experience is possible.

(Item 20)

A method according to Item 1, in which the virtual space data includes a third object different from the first object and the second object. The virtual camera includes a first camera configured to define a first visual field for generating the visual field image data. The virtual camera further includes a second camera configured to define a second visual field for generating an image to be projected on the third object. The method further includes inhibiting the first object or the second object, which is set as the at least a part of the outer appearance of the first, player character, from being displayed in the first, visual field. The method further includes displaying the first object or the second object, which is set as the at least a part of the outer appearance of the first player character, in the second visual field.

According to the method of this item, the user checks an appearance of the first player character projected on the third object in the virtual experience provided from a first-person point of view, to thereby be able to check his or her own display form in the virtual space. With this, an intuitive virtual experience can be provided.

(Item 21)

A method according to Item 19 or 20, further including arranging the virtual camera within a collision area for determining an occurrence of a collision between the first player character and the second object. The method further includes subjecting, when the occurrence of the collision between the first player character and the second object is determined, the visual-field image to image processing for reducing a visual effect to be provided to the user based on the visual-field image.

According to the method of this item, the visual-field image can be prevented from flickering when the outer appearance of the first player character is changed in the virtual experience provided from a first-person point of view.

(Item 22)

An information processing method according to any one of Items 19 to 21 for controlling a second head-mounted device including a display unit on the computer includes identifying virtual space data for defining a virtual space that includes the virtual camera; the first player character; the operation object; a second player character; the first object; and the second object. The method further includes moving the virtual camera in accordance with the movement of the second head-mounted device. The method further includes acquiring player information for controlling the first player character from the first head-mounted device connected to the second head-mounted device and so as to enable communication therebetween. The method further includes controlling the movement of the first player character and a display form of the at least a part of the outer appearance based on the player information. The method further includes defining the visual field of the virtual camera based on the movement of the virtual camera, and generating visual field image data based on the visual field and the virtual space data. The method further includes displaying a visual-field image on the second head-mounted device based on the visual field image data. The method further includes in, the player information, changing the at least a part of the outer appearance of the first player character from the first object to the second object in a case where the second object is set as the at least a part of the outer appearance of the first player character in place of the first object when the operation object is operated in accordance with the movement of the part of the body other than the head of the user wearing the first head-mounted device.

According to the method of this item, when another user designates the outer appearance of the first player character by operating the target object in the virtual space, the first player character whose outer appearance has been changed can easily be displayed in the visual field of the second head-mounted device. With this, it is possible to provide the user with a new virtual experience.

(Item 23)

A system for executing the method of any one of Items 19 to 22.

[Supplementary Note 4]

(Item 23)

An information processing method for controlling a first head-mounted device, method includes identifying virtual space data for defining a virtual space that includes a virtual camera; an operation object; and a plurality of target objects including a first object and a second object. The method further includes acquiring a detection result from a detection unit configured to detect a position of the head-mounted device and a position of a part of a body other than a head of a user. The method further includes moving the virtual camera in accordance with a movement of the head-mounted device. The method further includes moving the operation object in accordance with a movement of the part of the body. The method further includes selecting the first object or the second object in accordance with a movement of the operation object. The method further includes defining a visual field of the virtual camera based on a movement of the virtual camera, and generating visual field image data based on the visual field and the virtual space data. The method further includes displaying a visual-field image on the display unit based on the visual field image data. The method further includes changing a display form of the first object and/or the second object when the first object satisfies a selection condition for being selected by the operation object.

(Item 24)

A method according to Item 23, further including enabling the first object to be selected by the operation object, and disabling the second object from being selected by the operation object when the first object satisfies a selection condition for being selected by the operation object.

(Item 25)

A method according to Item 23 or 24, further including setting a collision area for each of the first object, the second object, and the operation object. The selection condition includes a condition that an overlapping area between the collision area of the operation object and the collision area of the first object is larger than an overlapping area between the collision area of the operation object and the collision area of the second object.

(Item 26)

A method according to any one of Items 23 to 25, in which the selection condition includes a condition that a distance between the operation object and the first object is smaller than a distance between the operation object and the second object.

(Item 27)

A method according to any one of Items 23 to 26, further including displaying, in the visual-field image, a UI image for setting the first object or the second object as a selection target of the operation object. The selection condition includes a condition that the first object is set as the selection target of the operation object by having the UI image operated by the operation object in advance.

(Item 28)

A method according to anyone of Items 23 to 27, further including setting any one of the first object and the second object as a selection target of the operation object at random when the first object and the second object are positioned within a predetermined range from the operation object. The selection condition includes a condition that the first object is set as the selection target.

(Item 29)

A system for executing the method of any one of Items 23 to 28.

What is claimed is:

1. A method comprising:
    defining a virtual space that includes, a first player character, a virtual camera associated with the first player character, an operation object, a first object, and a second object;
    defining a first outer appearance of the first player character in the virtual space based on the first object;
    detecting a position of a part of a body other than a head of a user;
    moving the operation object in accordance with a detected movement of the part of the body;
    selecting the second object in accordance with a predetermined movement of the operation object, wherein the second object is separate from the first player character prior to the selecting of the second object;

moving the second object in accordance with the detected movement of the operation object with the second object being selected; and changing, in response to contact between the first player character or the virtual camera and the second object, an outer appearance of the first player character from the first outer appearance to a second outer appearance, wherein the second outer appearance is based on the second object.

2. The method according to claim 1, further comprising:
detecting a position of a head-mounted device;
moving the virtual camera in the virtual space in response to a detected movement of the head-mounted device; and
displaying a first visual-field image on the head-mounted device based on a position of the virtual camera in the virtual space.

3. The method according to claim 1, wherein the virtual space further includes a third object different from the first object and the second object.

4. The method according to claim 3, wherein the virtual camera includes:
a first camera configured to define a first visual field; and
a second camera configured to define a second visual field to be projected on the third object, wherein the first visual field is different from the second visual field.

5. The method according to claim 4, wherein the first visual field is free of the first object in response to the first player character having the first outer appearance, and the first visual field is free of the second object in response to the first player character having the second outer appearance.

6. The method according to claim 4, wherein the second visual field includes the first object in response to the first player character having the first outer appearance, and the second visual field includes the second object in response to the first player character having the second outer appearance.

7. The method according to claim 4, wherein the third object includes a mirror object, and the second visual field includes the first player character.

8. The method according to claim 7, further comprising:
displaying the second visual field to the user in response to the first player character being closer than a predetermined distance from the second camera.

9. The method according to claim 7, further comprising:
preventing displaying of the second visual field to the user in response to the first player character being a predetermined distance or farther from the second camera.

10. The method according to claim 1, further comprising:
defining a first collision area surrounding the virtual camera;
defining a second collision area surrounding the second object in response to the selecting of the second object; and
determining contact between the first player character and the second object in response to coordinates of the first collision area overlapping with coordinates of the second collision area.

11. The method according to claim 10, further comprising:
darkening a visual field image provided to the user in response to the second object approaching the virtual camera with the second objecting being selected.

12. The method according to claim 1, further comprising:
displaying the first player character using a head-mounted device associated with a second user different from the user;

changing, in response to contact between the first player character and the second object, the outer appearance of the first player character displayed using the head-mounted device from the first outer appearance to the second outer appearance.

13. A system comprising:
a non-transitory computer readable medium configured to store instructions thereon; and
a processor connected to the non-transitory computer readable medium, wherein the processor is configured to execute the instructions for:
defining a virtual space that includes a virtual camera, a first player character, an operation object, a first object, and a second object;
defining a first outer appearance of the first player character in the virtual space based on the first object;
detecting a position of a part of a body other than a head of a user;
moving the operation object in accordance with a detected movement of the part of the body;
selecting the second object in accordance with a predetermined movement of the operation object, wherein the second object is separate from the first player character prior to the selecting of the second object;
moving the second object in accordance with the detected movement of the operation object with the second object being selected; and
changing, in response to contact between the first player character and the second object, an outer appearance of the first player character from the first outer appearance to a second outer appearance, wherein the second outer appearance is based on the second object.

14. The system according to claim 13, further comprising:
a head-mounted device, wherein the processor is configured to execute the instructions for:
detecting a position of the head-mounted device;
moving the virtual camera in the virtual space in response to a detected movement of the head-mounted device; and
instructing the head-mounted device to display a first visual-field image based on a position of the virtual camera in the virtual space.

15. The system according to claim 13, wherein the virtual space further includes a third object different from the first object and the second object.

16. The system according to claim 15, wherein the virtual camera includes:
a first camera configured to define a first visual field; and
a second camera configured to define a second visual field to be projected on the third object, wherein the first visual field is different from the second visual field.

17. The system according to claim 16, wherein the first visual field is free of the first object in response to the first player character having the first outer appearance, and the first visual field is free of the second object in response to the first player character having the second outer appearance.

18. The system according to claim 16, wherein the second visual field includes the first object in response to the first player character having the first outer appearance, and the second visual field includes the second object in response to the first player character having the second outer appearance.

19. The system according to claim 13, wherein the processor is configured to execute the instructions for:

defining a first collision area surrounding the virtual camera;

defining a second collision area surrounding the second object in response to the selecting of the second object; and determining contact between the first player character and the second object in response to coordinates of the first collision area overlapping with coordinates of the second collision area.

20. A method comprising:

defining a virtual space that includes a virtual camera, a first player character, an operation object, a first object, and a second object;

defining a first outer appearance of the first player character in the virtual space based on the first object;

setting a player attribute of the first player character to a first value in response to the first player character having the first outer appearance, wherein the player attribute is different from an outer appearance of the first player character;

detecting a position of a part of a body other than a head of a user;

moving the operation object in accordance with a detected movement of the part of the body;

selecting the second object in accordance with a predetermined movement of the operation object;

moving the second object in accordance with the detected movement of the operation object with the second object being selected;

changing, in response to contact between the first player character and the second object, the outer appearance of the first player character from the first outer appearance to a second outer appearance, wherein the second outer appearance is based on the second object; and changing the player attribute of the first player character to a second value in response to the first player character having the second outer appearance.

* * * * *